US006956909B2

(12) United States Patent
You et al.

(10) Patent No.: US 6,956,909 B2
(45) Date of Patent: Oct. 18, 2005

(54) TRANSMISSION RATE MATCHING APPARATUS AND METHOD FOR NEXT GENERATION MOBILE COMMUNICATION SYSTEM

(75) Inventors: Cheoi Woo You, Seoul (KR); Jee Woong Seol, Seoul (KR); Young Hwan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 597 days.

(21) Appl. No.: 09/793,141

(22) Filed: Feb. 27, 2001

(65) Prior Publication Data

US 2001/0017901 A1 Aug. 30, 2001

(30) Foreign Application Priority Data

Feb. 29, 2000 (KR) ........................................ 2000/10162

(51) Int. Cl.[7] .......................... H04K 1/02; H04L 25/03; H04L 25/49

(52) U.S. Cl. ........................ 375/296; 375/225; 375/285

(58) Field of Search ................................ 370/366, 532, 370/537, 540; 375/224, 225, 259, 285, 295, 296, 262, 265; 714/752, 756

(56) References Cited

U.S. PATENT DOCUMENTS 5,430,767 A * 7/1995 Min ........................... 375/340
6,442,176 B1 * 8/2002 Yahagi ....................... 370/474
6,668,023 B1 * 12/2003 Betts .......................... 375/285

* cited by examiner

*Primary Examiner*—Jean B. Corrielus
(74) *Attorney, Agent, or Firm*—Lee, Hong, Degerman, Kang & Schmadeka

(57) ABSTRACT

The present invention relates to a transmission rate matching apparatus and a method thereof for a next generation mobile communication system. In the conventional technology, when data bit is transmitted from a terminal to a base station, it is transmitted by radio frames, each column of a block interleaver includes biased data bit. Accordingly, in order to solve above-mentioned problem, the transmission rate matching apparatus for the next generation mobile communication system in accordance with the present invention comprises an encoder for performing error-correction-encoding of an input bit column, and generating a code word bit from the error-correction-encoded input bit column, a block interleaver for being inputted the code word bit, storing it as row unit, and outputting it as column unit, a switching unit for performing a switching algorithm for converting an output sequence of the code word bit crossly and outputting them to the block interleaver in order to distribute the biased data bits included in the each column of the block interleaver uniformly when the number of the code word bit of the encoder and the number of the column of the block interleaver are not coprime, a radio frame segment processing unit for generating a radio frame after being inputted the column unit data outputted from the block interleaver, and a transmission rate matching unit for matching the data bits included in the radio frame to a transmission format suitable for a transmission between a terminal and a base station, and transmitting it.

15 Claims, 26 Drawing Sheets

```
if(GCM(n,Fi                        //When"n"and "Fi"is coprime
        index=0;
        do while (index<index_Limit
                k=(index%n)+1;
                switching at Y^k ;
                index=index+1;
        end do;
                                   //When"n"and "Fi"is not coprime
        index =0;
        m=0;
        do while (index<index_Limit)
                k=( (index%n)+m)%n+1;
                swiching at Y^k;
                index=index+1;
                if(  ( index %(nFi))=0  ){m=0;}
                else
                        if( (index%LCM(n,Fi))=0 ) {m=m+1;}
        end do;
}
```

LCM(a,b):LEAST COMMON MULTIPLE BETWEEN a AND b
GCM(a,b):GREATEST COMMON MEASURE BETWEEN a AND b
%:MODULAR OPERATOR

FIG. 3

```
if(GCM(n,Fi                    //When"n"and "Fi"is coprime
        index=0;
        do while (index<index_Limit
                k=(index%n)+1;
                switching at Y^k ;
                index=index+1;
        end do;
                               //When"n"and "Fi"is not coprime
        index =0;
        m=0;
        do while (index<index_Limit)
                k=( (index%n)+m)%n+1;
                swiching at Y^k;
                index=index+1;
                if( ( index %(nFi))=0 ){m=0;}
                else
                        if( (index%LCM(n,Fi))=0 ) {m=m+1;}
        end do;
}
```

LCM(a,b):LEAST COMMON MULTIPLE BETWEEN a AND b
GCM(a,b):GREATEST COMMON MEASURE BETWEEN a AND b
%:MODULAR OPERATOR

FIG. 5

```
if(GCM(n,F ) =1){                          //When"n"and "Fi"is coprime
          index=0;
          do while (index < index_Limit)
                      k=(index %n)+1;
                      switching at  Y^k;
                      index=index+1;


          end do;
} else {                                   //When"n"and "Fi"is not coprime
          index=0 ;
          do while (index < index_Limit)
                      k=(index %n)+1;
                      switching at  Y^k;
                      index=index+1;
                      if (imdex%n = 0)          {switching at Y^c;}
          end do;
}
```

LCM(a,b):LEAST COMMON MULTIPLE BETWEEN a AND b
GCM(a,b):GREATEST COMMON MEASURE BETWEEN a AND b
%:MODULAR OPERATOR

FIG. 7

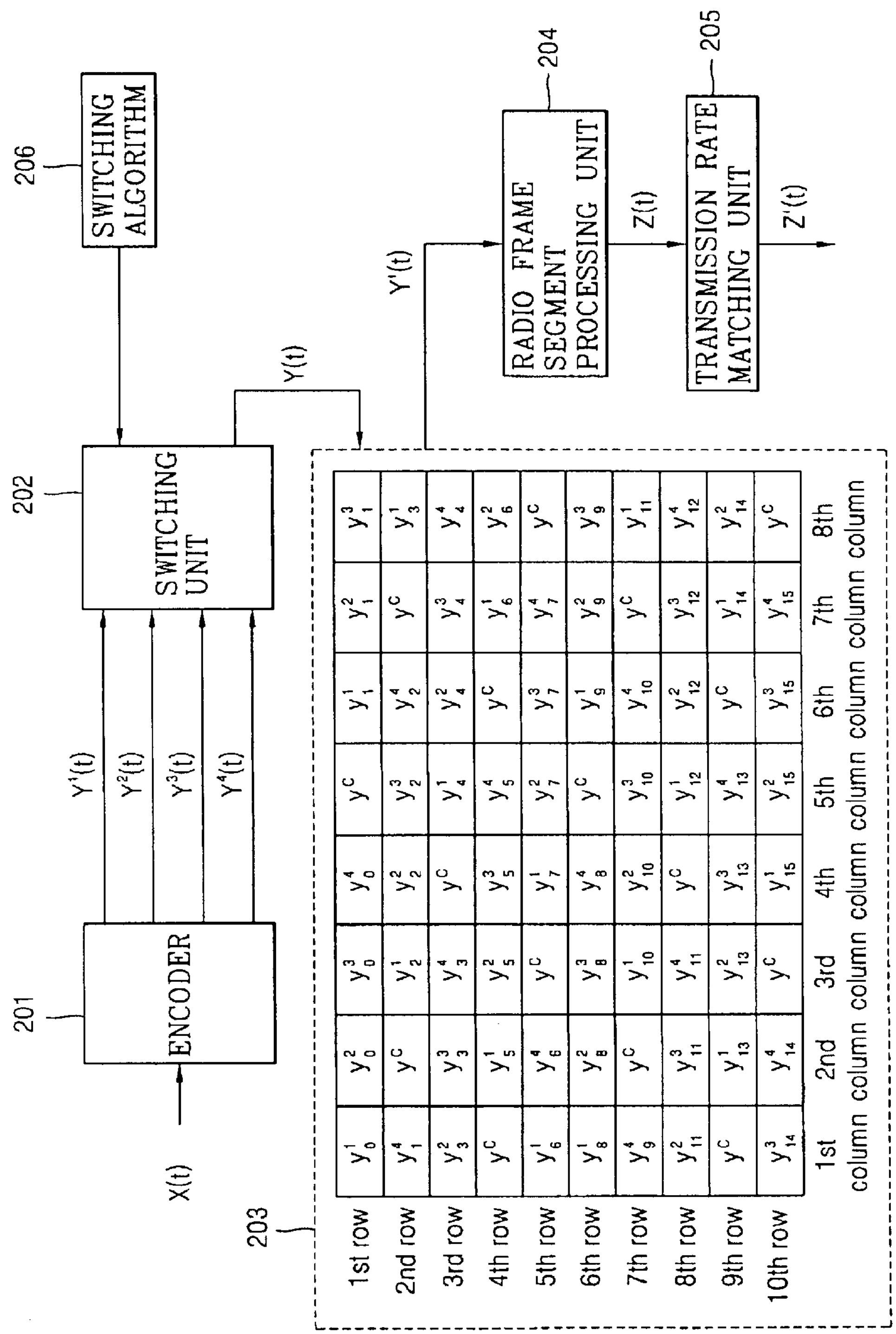

| | 1st column | 2nd column | 3rd column | 4th column | 5th column | 6th column | 7th column | 8th column |
|---|---|---|---|---|---|---|---|---|
| 1st row | $y^1_0$ | $y^2_0$ | $y^3_0$ | $y^4_0$ | $y^C$ | $y^1_1$ | $y^2_1$ | $y^3_1$ |
| 2nd row | $y^4_1$ | $y^C$ | $y^1_2$ | $y^2_2$ | $y^3_2$ | $y^4_2$ | $y^C$ | $y^1_3$ |
| 3rd row | $y^2_3$ | $y^3_3$ | $y^4_3$ | $y^C$ | $y^1_4$ | $y^2_4$ | $y^3_4$ | $y^4_4$ |
| 4th row | $y^C$ | $y^1_5$ | $y^2_5$ | $y^3_5$ | $y^4_5$ | $y^C$ | $y^1_6$ | $y^2_6$ |
| 5th row | $y^1_6$ | $y^4_6$ | $y^C$ | $y^1_7$ | $y^2_7$ | $y^3_7$ | $y^4_7$ | $y^C$ |
| 6th row | $y^1_8$ | $y^2_8$ | $y^3_8$ | $y^4_8$ | $y^C$ | $y^1_9$ | $y^2_9$ | $y^3_9$ |
| 7th row | $y^4_9$ | $y^C$ | $y^1_{10}$ | $y^2_{10}$ | $y^3_{10}$ | $y^4_{10}$ | $y^C$ | $y^1_{11}$ |
| 8th row | $y^2_{11}$ | $y^3_{11}$ | $y^4_{11}$ | $y^C$ | $y^1_{12}$ | $y^2_{12}$ | $y^3_{12}$ | $y^4_{12}$ |
| 9th row | $y^C$ | $y^1_{13}$ | $y^2_{13}$ | $y^3_{13}$ | $y^4_{13}$ | $y^C$ | $y^1_{14}$ | $y^2_{14}$ |
| 10th row | $y^3_{14}$ | $y^4_{14}$ | $y^C$ | $y^1_{15}$ | $y^2_{15}$ | $y^3_{15}$ | $y^4_{15}$ | $y^C$ |

$for(i=0;i<F_i; i++)$ $j=(2xi+(b-\lfloor 2xi/F_i \rfloor)\%2)\%F_i$ where, index b is used to indicate $Y^1$'s bit (b=2) and $Y^2$'s bit (b=1), and $F_i \in \{2,4,8\}$

FIG. 13A

IMAGINARY INTERLEAVER FOR $Y^1(t)$ — S501

| C | C | C | C | C | C | C | C |
|---|---|---|---|---|---|---|---|
| $y^1_0$ | $y^1_1$ | $y^1_2$ | $y^1$ | $y^1_4$ | $y^1_5$ | $y^1$ | $y^1$ |
| $y^1_8$ | $y^1$ | $y^1_{10}$ | $y^1_{11}$ | $y^1_{12}$ | $y^1_{13}$ | $y^1_1$ | $y^1_1$ |
| $y^1_{16}$ | $y^1_1$ | $y^1_1$ | $y^1_1$ | $y^1_{20}$ | $y^1_{21}$ | $y^1$ | $y^1$ |
| $y^1_{24}$ | $y^1$ | $y^1$ | $y^1$ | $y^1$ | $y^1_{29}$ | $y^1$ | $y^1$ |

IMAGINARY INTERLEAVER FOR $Y^2(t)$ — S502

| C'-0 | C'-1 | C'-2 | C'-3 | C'-4 | C'-5 | C'-6 | C'-7 |
|---|---|---|---|---|---|---|---|
| $y^2_0$ | $y^2_1$ | $y^2_2$ | $y^2_3$ | $y^2_4$ | $y^2_5$ | $y^3_6$ | $y^2_7$ |
| $y^2_8$ | $y^2_9$ | $y^2_{10}$ | $y^2_{11}$ | $y^2_{12}$ | $y^2_{13}$ | $y^2_{14}$ | $y^2_{15}$ |
| $y^2_{16}$ | $y^2_{17}$ | $y^2_{18}$ | $y^2_{19}$ | $y^2_{20}$ | $y^2_{21}$ | $y^2_{22}$ | $y^2_{23}$ |
| $y^2_{24}$ | $y^2_{25}$ | $y^2_{26}$ | $y^2_{27}$ | $y^2_{28}$ | $y^2_{29}$ | $y^2_{30}$ | $y^2_{31}$ |

BLOCK INTERLEAVER FOR $Y^1(t)$ AND $Y^2(t)$ — 203

| C-0 | C-1 | C-2 | C-3 | C-4 | C-5 | C-6 | C-7 |
|---|---|---|---|---|---|---|---|
| $y^1_0$ | $y^2_0$ | $y^1_1$ | $y^2_1$ | $y^1_2$ | $y^2_2$ | $y^1$ | $y^2$ |
| $y^2_4$ | $y^1_4$ | $y^2$ | $y^1_5$ | $y^2_6$ | $y^1_6$ | $y^2_7$ | $y^1_7$ |
| $y^1_8$ | $y^2_8$ | $y^1_9$ | $y^2_9$ | $y^1_{10}$ | $y^2_{10}$ | $y^1_{11}$ | $y^2_{11}$ |
| $y^2_{12}$ | $y^1_{12}$ | $y^2_{13}$ | $y^1_{13}$ | $y^2_{14}$ | $y^1_{14}$ | $y^2_{15}$ | $y^1_{15}$ |
| $y^1_{16}$ | $y^2_{16}$ | $y^1_{17}$ | $y^2_{17}$ | $y^1_{18}$ | $y^2_{18}$ | $y^1_{19}$ | $y^2_{19}$ |
| $y^2_{20}$ | $y^1_{20}$ | $y^2_{21}$ | $y^1_{21}$ | $y^2_{22}$ | $y^1_{22}$ | $y^2_{23}$ | $y^1_{23}$ |
| $y^1_{24}$ | $y^2_{24}$ | $y^1_{25}$ | $y^2_{25}$ | $y^1_{26}$ | $y^2_{26}$ | $y^1_{27}$ | $y^2_{27}$ |
| $y^2_{28}$ | $y^1_{28}$ | $y^2_{29}$ | $y^1_{29}$ | $y^2_{30}$ | $y^1_{30}$ | $y^2_{31}$ | $y^1_{31}$ |

FIG. 13B

IMAGINARY INTERLEAVER FOR $Y^1(t)$ — S501

| C | C | C | C | C | C | C | C |
|---|---|---|---|---|---|---|---|
| $y^1_0$ | $y^1_1$ | $y^1_2$ | $y^1_3$ | $y^1_4$ | $y^1_5$ | $y^1_6$ | $y^1_7$ |
| $y^1_8$ | $y^1_9$ | $y^1_{10}$ | $y^1_{11}$ | $y^1_{12}$ | $y^1_{13}$ | $y^1_{14}$ | $y^1_{15}$ |
| $y^1_{16}$ | $y^1_{17}$ | $y^1_{18}$ | $y^1_{19}$ | $y^1_{20}$ | $y^1_{21}$ | $y^1_{22}$ | $y^1_{23}$ |
| $y^1_{24}$ | $y^1_{25}$ | $y^1_{26}$ | $y^1_{27}$ | $y^1_{28}$ | $y^1_{29}$ | $y^1_{30}$ | $y^1_{31}$ |

IMAGINARY INTERLEAVER FOR $Y^2(t)$ — S502

| C'-0 | C'-1 | C'-2 | C'-3 | C'-4 | C'-5 | C'-6 | C'-7 |
|---|---|---|---|---|---|---|---|
| $y^2_0$ | $y^2_1$ | $y^2_2$ | $y^2_3$ | $y^2_4$ | $y^2_5$ | $y^3_6$ | $y^2_7$ |
| $y^2_8$ | $y^2_9$ | $y^2_{10}$ | $y^2_{11}$ | $y^2_{12}$ | $y^2_{13}$ | $y^2_{14}$ | $y^2_{15}$ |
| $y^2_{16}$ | $y^2_{17}$ | $y^2_{18}$ | $y^2_{19}$ | $y^2_{20}$ | $y^2_{21}$ | $y^2_{22}$ | $y^2_{23}$ |
| $y^2_{24}$ | $y^2_{25}$ | $y^2_{26}$ | $y^2_{27}$ | $y^2_{28}$ | $y^2_{29}$ | $y^2_{30}$ | $y^2_{31}$ |

BLOCK INTERLEAVER FOR $Y^1(t)$ AND $Y^2(t)$ — 203

| C-0 | C-1 | C-2 | C-3 | C-4 | C-5 | C-6 | C-7 |
|---|---|---|---|---|---|---|---|
| $y^1_0$ | $y^2_0$ | $y^1_1$ | $y^2_1$ | $y^1_2$ | $y^2_2$ | $y^1_3$ | $y^2_3$ |
| $y^2_4$ | $y^1_4$ | $y^2_5$ | $y^1_5$ | $y^2_6$ | $y^1_6$ | $y^2_7$ | $y^1_7$ |
| $y^1_8$ | $y^2_8$ | $y^1_9$ | $y^2_9$ | $y^1_{10}$ | $y^2_{10}$ | $y^1_{11}$ | $y^2_{11}$ |
| $y^2_{12}$ | $y^1_{12}$ | $y^2_{13}$ | $y^1_{13}$ | $y^2_{14}$ | $y^1_{14}$ | $y^2_{15}$ | $y^1_{15}$ |
| $y^1_{16}$ | $y^2_{16}$ | $y^1_{17}$ | $y^2_{17}$ | $y^1_{18}$ | $y^2_{18}$ | $y^1_{19}$ | $y^2_{19}$ |
| $y^2_{20}$ | $y^1_{20}$ | $y^2_{21}$ | $y^1_{21}$ | $y^2_{22}$ | $y^1_{22}$ | $y^2_{23}$ | $y^1_{23}$ |
| $y^1_{24}$ | $y^2_{24}$ | $y^1_{25}$ | $y^2_{25}$ | $y^1_{26}$ | $y^2_{26}$ | $y^1_{27}$ | $y^2_{27}$ |
| $y^2_{28}$ | $y^1_{28}$ | $y^2_{29}$ | $y^1_{29}$ | $y^2_{30}$ | $y^1_{30}$ | $y^2_{31}$ | $y^1_{31}$ |

TRANSMISSION RATE MATCHING APPARATUS AND METHOD FOR NEXT GENERATION MOBILE COMMUNICATION SYSTEM

BACKGROUND OF THE INVENTION

1. Field of the Invention

The present invention relates to a next generation mobile communication system for distributing biased data bits transmitted by being included to each column of a block interleaver uniformly in a wire/wireless communication system transmitting data between a base station and a terminal by performing a transmission matching after block-interleaving error-correction-encoded code word bits, in particular to a transmission rate matching apparatus and a method thereof for a next generation mobile communication system which is capable of performing efficient transmission rate matching by crossing code word bits by using a switching algorithm for distributing the biased data bits uniformly or inputting an imaginary bit to an interleaver.

2. Description of the Prior Art

Generally, the conventional next generation mobile communication system uses an encoder for performing error-correction-coding and a channel interleaver together in order to provide various transmission speeds and service qualities. In Particular, a 3GPP ($3^{rd}$ generation partnership project) adapts the above-described transmission method for an IMT-2000.

Lots of interleaving methods are used at present, but generally a block interleaver method constructed with a row and a column is used. The 3GPP also adapts a method same kind with the block interleaver method.

FIG. 1 is a block diagram illustrating a next generation mobile communication system having the conventional up-link format that comprises an encoder 101 for performing error-correction-encoding of an inputted bit column X(t), a switching unit 102 for sequentially switching code word bits coded in the encoder, a block interleaver 103 for interleaving the code word bits switched in the switching unit, a radio frame segment processing unit 104 for dividing the bits interleaved in the block interleaver 103 into one radio frame unit, and a transmission rate matching unit 105 for performing transmission rate matching by receiving the radio frame divided in the radio frame segment processing unit 104 and arranging the received radio frame to have a certain transmission rate and transmission format which is suitable for transmission.

The conventional technology having above-described construction will now be described in detail with reference to accompanying drawings.

The encoder 101 performs error-correction-encoding of the input bit column X(t), and generates the code word bit from the error-correction-coded input bit column.

The switching unit 102 performs switching of the code word bits generated in the encoder 101 sequentially. Herein, the code word bit Y(t) to be performed the switching is constructed with $y_0$, $y_1$, $y_{N-2}$, $y_{N-1}$ bits. After that, the switching unit 102 inputs the switching code word bits from left side of a 1st row of the block interleaver 103 to right side, when the 1st row is inputted all, a 2nd row is inputted, when the 2nd row is inputted all, a 3rd row is inputted, it is repeated up to the last row.

When the code word bits are all inputted to the block interleaver 103, the interleaver 103 outputs first the data bits included in the 1st column from up to down, when the data bits are outputted all, the data bits included in the 2nd column are outputted from up to down, when the data bits are outputted all, the data bits included in the 3 column are outputted from up to down, it is repeated up to the last column Fi. The outputted code word bit Y'(t) is constructed with $y_0$, $y_{Fi}$, $y_{2Fi}$, . . . , $y_{(R-1)Fi}$, $y_1$, $y_{Fi+1}$, . . . , $y_{(R-1)Fi+1}$, $y_2$, . . . , $y_{Fi-1}$ . . . , $y_{RFi-1}$ bit columns.

Herein, the number of the column Fi of the block interleaver 103 is determined by transmission time interval TTI. For example, when TTI is 10 msec, Fi is set as 1, when TTI is 20 msec, Fi is set as 2, when TTI is 40 msec, Fi is set as 4, when TTI is 80 msec, Fi is set as 8.

When TTI is 40 msec(Fi=4), the radio frame segment processing unit 104 divides data bits of the block interleaver 103 so as to be total four radio frames in order to make R number of bits included in the each column of the clock interleaver 103 into one radio frame, and inputs the radio frames to the transmission matching unit 105. Herein, the one radio frame Z(t) inputted to the transmission rate matching unit 105 is constructed with $Z_1$, $Z_2$, $Z_{Fi-1}$, $Z_F$, code word bits, the code word bits Z(t) are constructed with $y_{(j-1)}$, $y_{Fi+(j-1)}$, $y_{2Fi+(j-1)}$, $y_{(R-2)Fi+(j-1)}$, $y_{(R-1)Fi+(j-1)}$ bit columns.

And, the transmission rate matching unit 105 performs transmission rate matching about the data bits included in the radio frame in order to match the transmission format, and transmits it to the base station. Herein, the radio frame Z'(t) transmitted to the base station is constructed with $Z_1'$,$Z_2'$, . . . ,$Z_{Fi-1}'$,$Z_{Fi}'$ code word bits, the code word bits $Z_j'(t)$ is constructed with $Z_j^0$,$Z_j^1$, . . . , $Z_j^{N'-1}$, $Z_j^{N'}$ bit columns.

When data bit is transmitted from the terminal to the base station, because the next generation mobile communication system having the conventional up-link format transmits the data bit as the each radio frame unit, the data bit transmitted by being included in the each column of the block interleaver 103 has to be distributed uniformly for the efficient transmission rate matching.

However, because the switching unit 102 inputs the code word bits of the encoder 101 to the block interleaver 103 by switching them only sequentially, the biased data bit problem occurs. Particularly, when the number of the error-correction-coded code word bit n and the number of the column of the block interleaver Fi are not coprime, the above-mentioned problem occurs.

SUMMARY OF THE INVENTION

In order to solve above-mentioned problem, the object of the present invention is to provide a transmission rate matching apparatus and a method thereof for a next generation mobile communication system for distributing biased data bits included in each column of a block interleaver uniformly by converting output sequence of code word bits crossly and inputting them to the block interleaver when the code word bits occurred in an error-correction-encoding process are interleaved in the block interleaver.

The other object of the present invention is to provide a transmission rate matching apparatus and a method thereof for a next generation mobile communication system which is capable of distributing the biased data bits outputted from the block interleaver uniformly by inputting an imaginary bit to the block interleaver when the transmission rate matching is performed about each column of the block interleaver after interleaving the code word bits occurred in the error-correction-encoding process in the block interleaver.

The another object of the present invention is to provide a transmission rate matching apparatus and a method thereof for a next generation mobile communication system which is capable of reducing the quantity of a memory buffer by comprising a block interleaver having the memory buffer and an address counter and making not to perform a count operation in an imaginary bit input in order to solve the above-mentioned problem which requires bigger quantity of the memory buffer than an actual needed memory buffer due to inputting the imaginary bit to the block interleaver.

Accordingly, in order to achieve above-mentioned objects, the transmission rate matching apparatus for the next generation mobile communication system in accordance with the present invention comprises an encoder for performing error-correction-encoding of an input bit column, generating and outputting a code word bit from the error-correction-encoded input bit column, a block interleaver for being inputted the code word bit and interleaving it, a switching unit for performing a switching algorithm for distributing the biased data bits included in the each column of the block interleaver uniformly by converting an output order of the code word bit crossly and inputting them to the block interleaver, a radio frame segment processing unit for dividing the data bits into bit column of radio frame unit in order to make the data bits included in the each column of the block interleaver into one radio frame, and a transmission rate matching unit for matching the data bits included in the radio frame.

In addition, the transmission rate matching method for the next generation mobile communication system in accordance with the present invention comprises generating the code word bit from the error-correction-encoded input bit column, interleaving the code word bits after being inputted them, judging whether the number of the code word bit n of the encoder and the number of the column Fi of the block interleaver are coprime, converting the output sequence of the code word bits crossly in order to distribute the biased data bits included in the each column of the block interleaver uniformly when the number of the code word bit n of the encoder and the number of the column Fi of the block interleaver are not coprime, inputting the converted code word bits to the block interleaver, dividing the data bits into bit column of the radio frame unit in order to make the uniform data bits included in the each column of the block interleaver into one radio frame, and matching the data bits included in the radio frame.

The objects, advantages and progressiveness of the present invention will now be described through the overall descriptions, and the present invention may be embodied in several forms without departing from the spirit or essential characteristics thereof.

BRIEF DESCRIPTION OF THE DRAWINGS

FIG. 3 illustrates a switching algorithm about the transmission rate matching method for the next generation mobile communication system in accordance with the present invention when the number of the code word bit n of the encoder and the number of the column Fi of the block interleaver are not coprime in FIG. 2.

FIG. 5 illustrates the other switching algorithm about the transmission rate matching method for the next generation mobile communication system in accordance with the present invention when the number of the code word bit n of the encoder and the number of the column Fi of the block interleaver are not coprime in FIG. 2.

FIG. 7 illustrates the operation of the block interleaver when the number of the code word bit n is 4 and the number of the column of the block interleaver Fi is 8 and the switching algorithm of FIG. 5 is adapted.

FIG. 13 is a detailed block diagram illustrating the relationship between the storing position of the imaginary interleaver and block interleaver performed according to the algorithm of FIG. 12 when the number of the column Fi of the block interleaver is 8.

DETAILED DESCRIPTION OF THE PREFERRED EMBODIMENT

Figure 1:
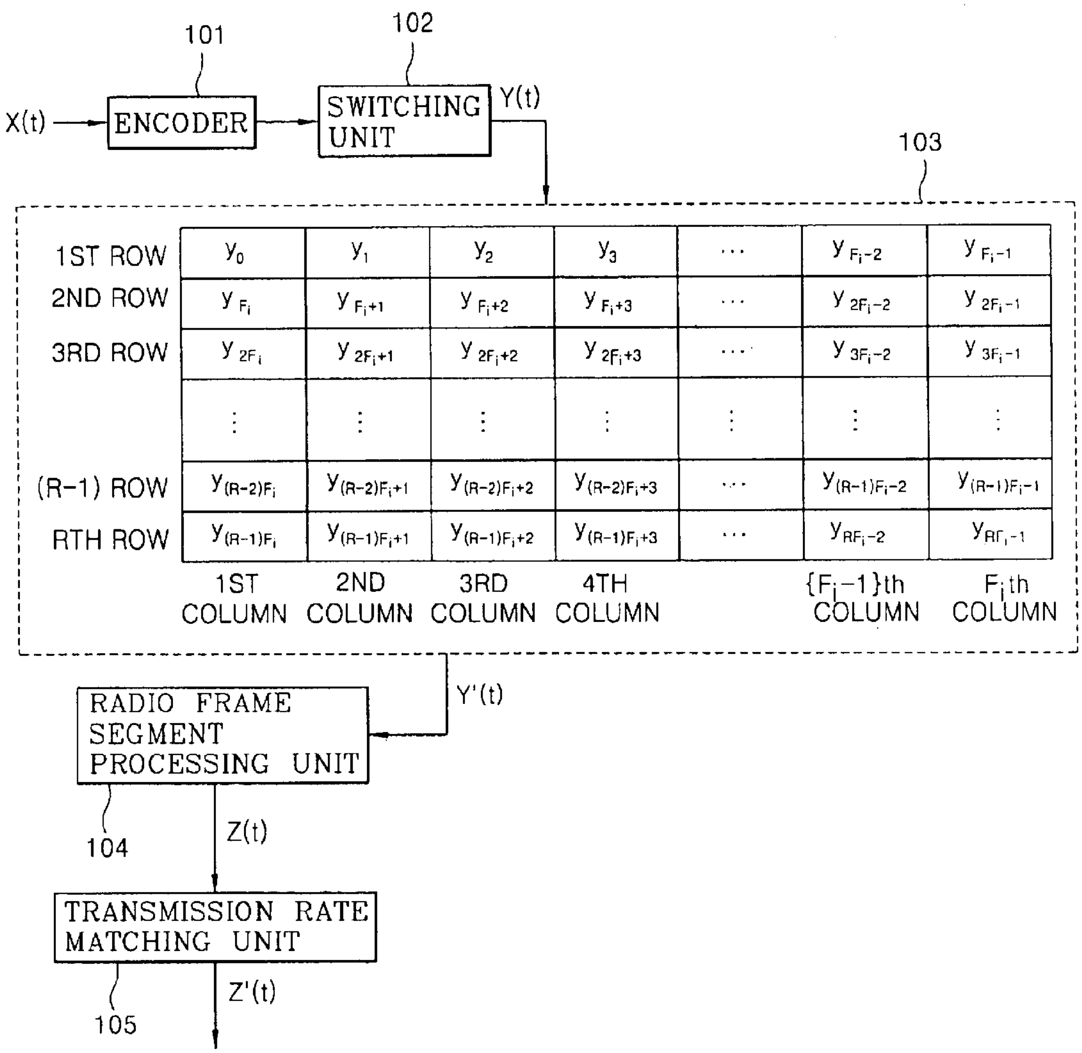
FIG. 1 is a block diagram for a next generation mobile communication system having an unlink format for transmitting data from the conventional terminal to a base station.

A first embodiment of a transmission rate matching apparatus for a next generation mobile communication system in accordance with the present invention comprises an encoder 201 for performing error-correction- encoding of an input bit column, generating and outputting a code word bit from the error-corrections encoded input bit column, a block interleaver 203 for being inputted the code word bit and interleaving it, a switching unit 202 for performing a switching algorithm 206 for distributing the biased data bits included in the each column of the block interleaver 203 by converting an output order of the code word bit crossly and inputting them to the block interleaver 203 when code word bit number n of the encoder and column number Fi of the block interleaver are not coprime, a radio frame segment processing unit 204 for dividing the data bits into bit column of radio frame unit in order to make the data bits included in the each column of the block interleaver 203 into one radio frame, and a transmission rate matching unit 205 for matching the data bits included in the radio frame.

The operation and effect of the first embodiment will now be described with reference to accompanying drawings.

In FIG . 2, K number of input bit, namely, $X^1(t)$, $X^2(t)$, ^, $X^k(t)$ are inputted to the encoder 201, the encoder 201 performs error-correction-encoding and outputs the error-correction-encoded n bit code word bit $Y^1(t)$, $Y^2(t)$, ^, $Y^n(t)$. Herein, the outputted code word bit $Y^1(t)$ are constructed with $y_0{}'$, $y_1{}'$, . . . , $y_{N-2}{}'$, $y_{N-1}{}'$ bit columns And, the switching unit 202 converts the output sequence of the code word bits crossly by performing the switching algorithm 206 for distributing the code word bits uniformly in order to prevent the code word bit from being biased to the each column of the block interleaver, and inputs the converted code word bits to the block interleaver 203.

Herein, as depicted in FIG. 3, the switching algorithm 206 judges whether the code word bit number n of the encoder 201 and column number Fi of the block interleaver 203 are coprime.

When the code word bit number n of the encoder 201 and column number Fi of the block interleaver 203 are coprime, the greatest common measure GCM of the code word bit number n and column number Fi of the block interleaver is 1. There is no coprime excluding it.

When the code word bit number n of the encoder 201 and column number Fi of the block interleaver 203 are coprime, the switching algorithm 206 yields a value $Y^k$ to be performed switching through a value k found by adding "1" to a value found by performing a modular operation (index % n) to the output sequence value (index) of the encoder 201 and code word bit number n. And, the switching unit 202 performs switching of the yielded value, and inputs it to the block interleaver 203. The above-described operation is performed repeatedly up to the total bit number ($index_{13}Limit$) of the error-correction-encoded bit outputted from the encoder 201.

On the contrary, when they are not coprime, the switching algorithm 206 yields a switching value $Y^k$ through a value k found by performing the modular operation (index % n) to the output sequence value (index) of the encoder 201 and code word bit number n, adding integer value m again, and adding 1 to a value found by performing the modular operation again to the added value m and code word bit number n. The yielded value is inputted to the block interleaver 203 after being performed switching.

When the value yielded by multiplying the code word bit number n to the column number Fi of the block interleaver and the value yielded by performing the modular operation (index % (n×Fi)) to the output order value (index) of the encoder are 0, the switching algorithm 206 makes the integer value (m) as 0. When the yielded value is not 0 and the value found by performing the modular operation of (index % LCM(n, Fi)) is 0, the switching algorithm adjusts the integer value (m) by adding "1" to the integer value (m).

When the switching algorithm 206 is performed, the code word bits outputted from the encoder 201 are crossly inputted to the block interleaver 203. Herein, the code word bits $Y^1(t)$ outputted from the encoder are constructed with $y_0{}^j$, $y_1{}'$, . . . , $y_{N-2}{}'$, $y_{N-1}{}'$ bit columns.

Figure 2:
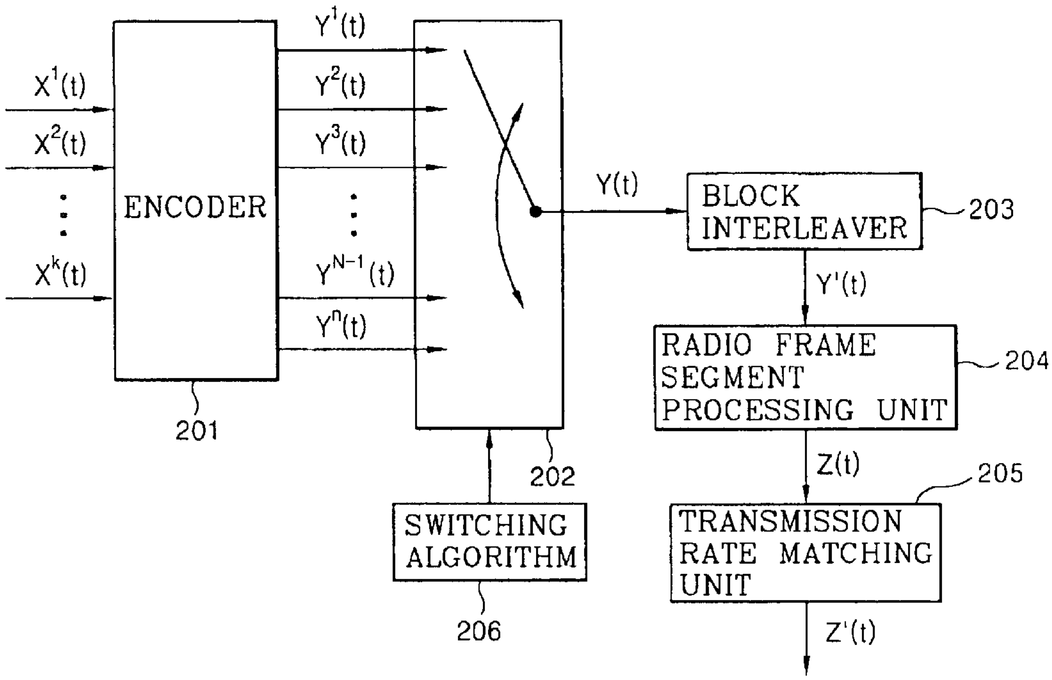
FIG. 2 is a block diagram illustrating a first embodiment of a transmission rate matching apparatus for a next generation mobile communication system in accordance with the present invention comprising an encoder having k/n code rate, a switching unit for converting sequentially according to a set switching algorithm, and a block interleaver.
Figure 4:
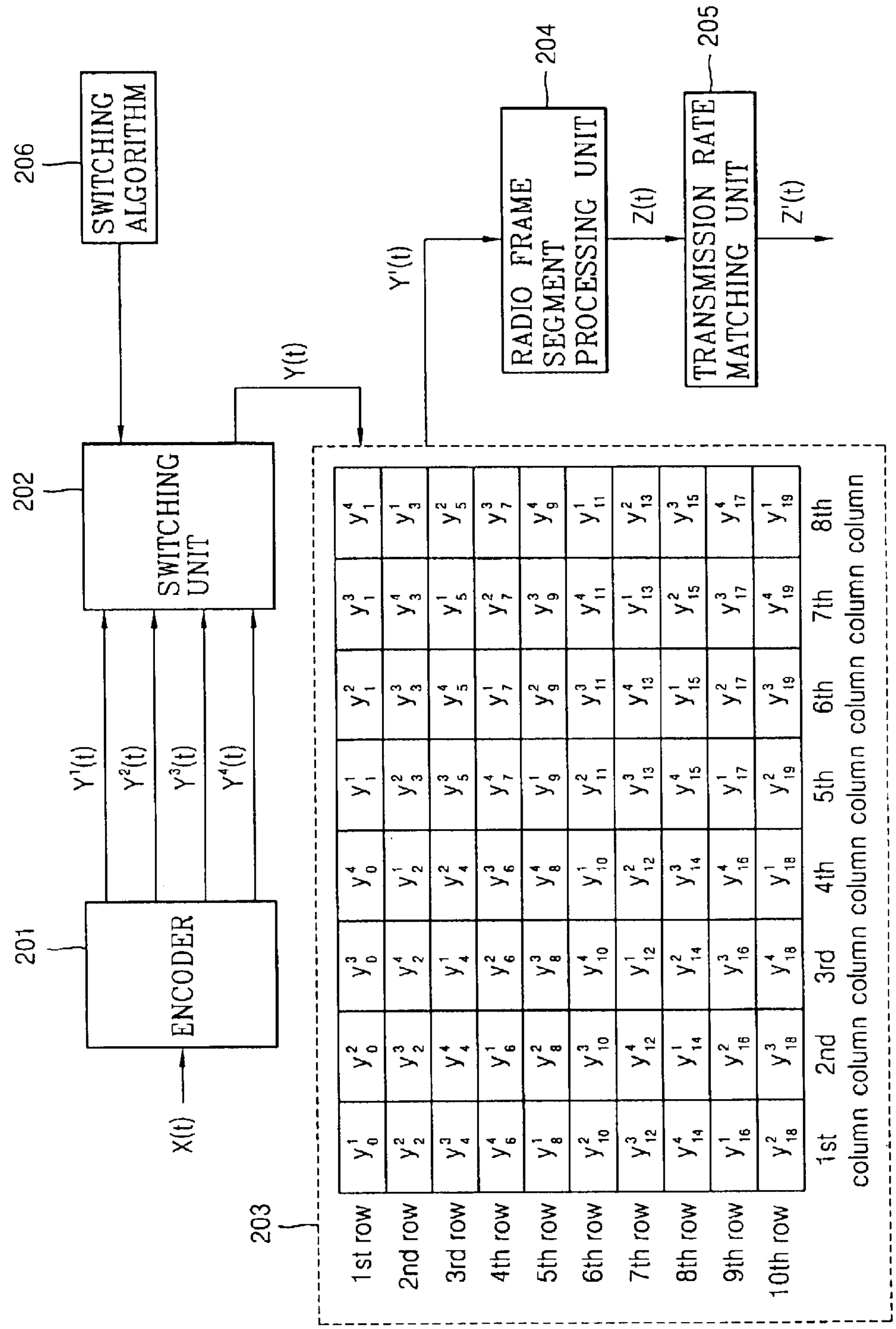
FIG. 4 is a block diagram illustrating operation of the block interleaver and switching unit when the number of the code word bit n is 4 and the number of the column of the block interleaver Fi is 8 in FIG. 2 and the switching algorithm of FIG. 3 is adapted.

Accordingly, the switching algorithm of FIG. 3 is adapted when the code word bit number n outputted from the encoder 201 of FIG. 2 is 4 and the column number Fi of the block interleaver is 8, as depicted in FIG. 4, the code word bits are crossly inputted to the block interleaver 203 in order of ($y^1$, $y^2$, $y^3$, $y^4$), ($y^2$, $y^3$, $y^4$, $y^1$), ($y^3$, $y^4$, $y^1$, $y^2$), ($y^4$, $y^1$, $y^2$, $y^3$).

Figure 10:
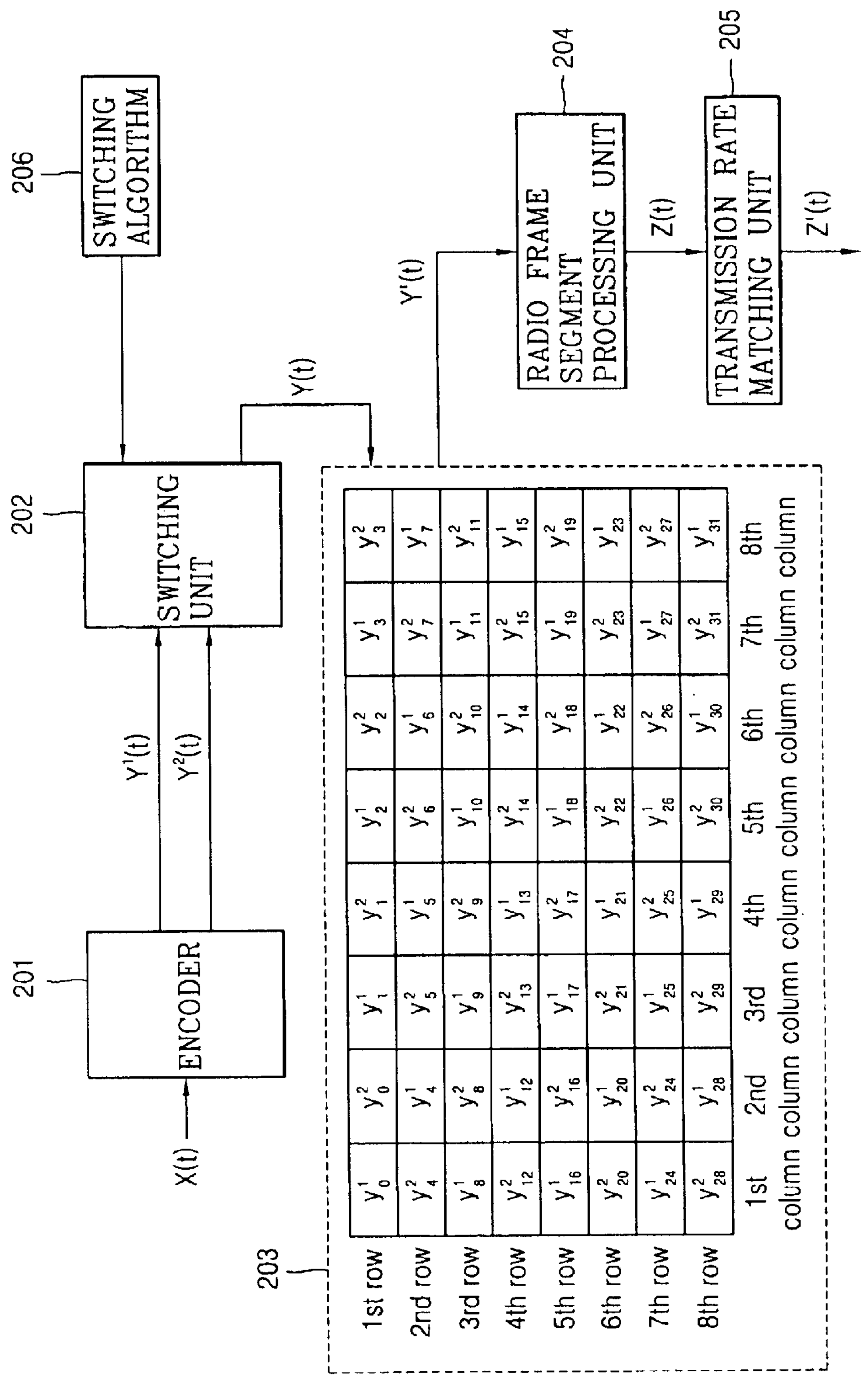
FIG. 10 illustrates operation of the block interleaver and switching unit when the number of the code word bit n of the encoder is 2 and the number of the column Fi of the block interleaver is 8 and the switching algorithm of FIG. 3 is adapted.

In addition, FIG. 10 illustrates operation of the block interleaver and switching unit when the code word bit number n of the encoder is 2 and column number Fi of the block interleaver is 8 and the switching algorithm of FIG. 3 is adapted.

Accordingly, the switching algorithm of FIG. 3 is adapted when the code word bit number n outputted from the encoder 201 of FIG. 2 is 4 and the column number Fi of the block interleaver is 8, as depicted in FIG. 10, the code word bits are crossly inputted to the block interleaver 203 in order of ($y^1$, $y^2$), ($y^2$, $y^1$).

Accordingly, the bits included in the each column of the block interleaver 203, namely, the bits included in $Y^1(t)$, $Y^2(t)$, $Y^3(t)$, $Y^4(t)$ are not biased but distributed uniformly.

Herein, the input/output sequence of the block interleaver 203 is same with the input/output sequence of the block interleaver 103.

The radio frame segment processing unit 204 divides the R number of bits outputted from the block interleaver 203 so as to be one radio frame, and generates radio frames as many as the column number Fi set in advance by the transmission time interval TTI.

When the radio frame generated by the radio frame segment processing unit 204 is inputted to the transmission rate matching unit 206, the transmission rate matching unit 206 performs the general transmission rate matching as the radio frame unit. After that, the bits after the transmission rate matching are transmitted to the base station.

When the switching algorithm of FIG. 3 is embodied in the other embodiment of the present invention, the switching unit is not required essentially. In other words, when the input sequence of the bits inputted to the block interleaver 203 is same with the sequence of the switching algorithm of FIG. 3, the biased data bits included in the each column of the block interleaver 203 can be distributed uniformly by any embodiment without being limited by the first embodiment.

The second embodiment of the transmission rate matching apparatus and thereof for the next generation mobile communication system in accordance with the present invention comprises the encoder 201 for performing the operation same with the encoder 101 of the first embodiment, block interleaver 203, radio frame segment processing unit 204, transmission rate matching unit 205 and a switching unit 202 for performing a switching algorithm 206 for distributing the biased data bits included in the each column of the block interleaver 203 uniformly by switching the output bits outputted from the encoder sequentially, switching the imaginary bit, and inserting it into the block interleaver when code word bit number n of the encoder and column number Fi of the block interleaver are not coprime.

The operation and effect of the second embodiment of the present invention will now be described with reference to accompanying drawings.

Figure 6:
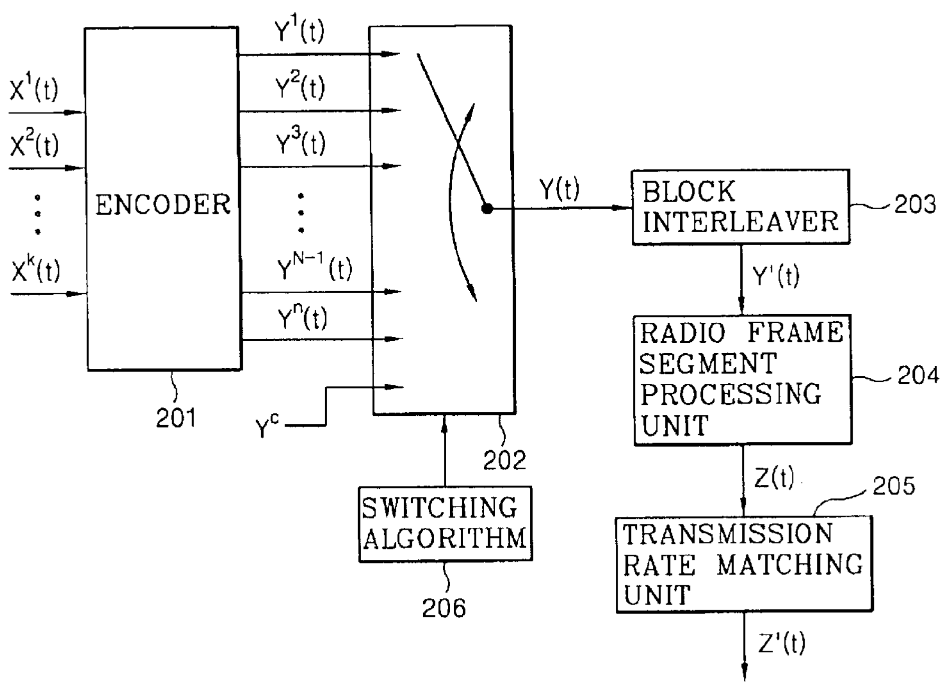
FIG. 6 is a block diagram of a second embodiment about the transmission rate matching apparatus for the next generation mobile communication system adapting the switching algorithm of FIG. 5.

As depicted in FIG. 5 and FIG. 6, when the code word bit number n of the encoder and column number Fi of the block interleaver are coprime, the operation of the switching algorithm 206 of FIG. 3 and FIG. 4 is same with the first embodiment, when they are not coprime, the switching unit 202 inputs the code word bit outputted from the encoder 201 to the block interleaver 203 after switching them, and inserts the imaginary bit $y^c$ to the block interleaver 203 after switching it.

In other words, the switching unit 202 performs switching of the code word bits outputted from the encoder 201 in order of $Y^1(t)$, $Y^2(t)$, . . . , $Y^n(t)$, and performs switching of the imaginary bit $y^C$. In other words, the switching unit 202 performs switching of the output of the encoder 201 and imaginary bit $y^c$ repeatedly in order of $Y^1(t)$, $Y^2(t)$, . . . , $Y^n(t)$, $Y^c$, and inputs them to the block interleaver 203.

Accordingly, when the switching algorithm of FIG. 5 is adapted and the code word bit number n outputted from the encoder 201 of FIG. 6 is 4 and column number Fi of the block interleaver 203 is 8, as depicted in FIG. 7, the code word bits are inputted to the block interleaver 203 in order of ($y^1$, $y^2$, $y^3$, $y^4$).

Accordingly, as depicted in FIG. 6, the bits included in the each column of the block interleaver 203, namely, the bits included in $Y^1(t)$, $Y^2(t)$, $Y^3(t)$, $Y^4(t)$ are distributed uniformly without being biased.

The input order of the code word bits to the block interleaver 203 is same with the first embodiment of the present invention.

When the switching algorithm of FIG. 5 is embodied in the other system, there is no need to use the switching unit necessarily. In other words, when the sequence of the input bits inputted to the block interleaver 203 is same with the sequence of the switching algorithm of FIG. 5, the biased data bits included in the each column of the block interleaver 203 can be distributed uniformly by any embodiment without being limited by the second embodiment.

Accordingly, in the embodiments of the transmission rate matching apparatus and the method thereof for the next generation mobile communication system in accordance with the present invention, the switching unit 202 performs the switching by using the switching algorithm depicted in FIG. 3 or FIG. 5, accordingly the code word bits outputted from the encoder 201 can be distributed uniformly without being biased to the block interleaver 203, However, as depicted in FIG. 7, when the imaginary bit $y^c$ is inserted into the block interleaver 203, a memory buffer of the block interleaver 203 requires a lot more quantity of buffer than an actual needed memory buffer.

Figure 8:
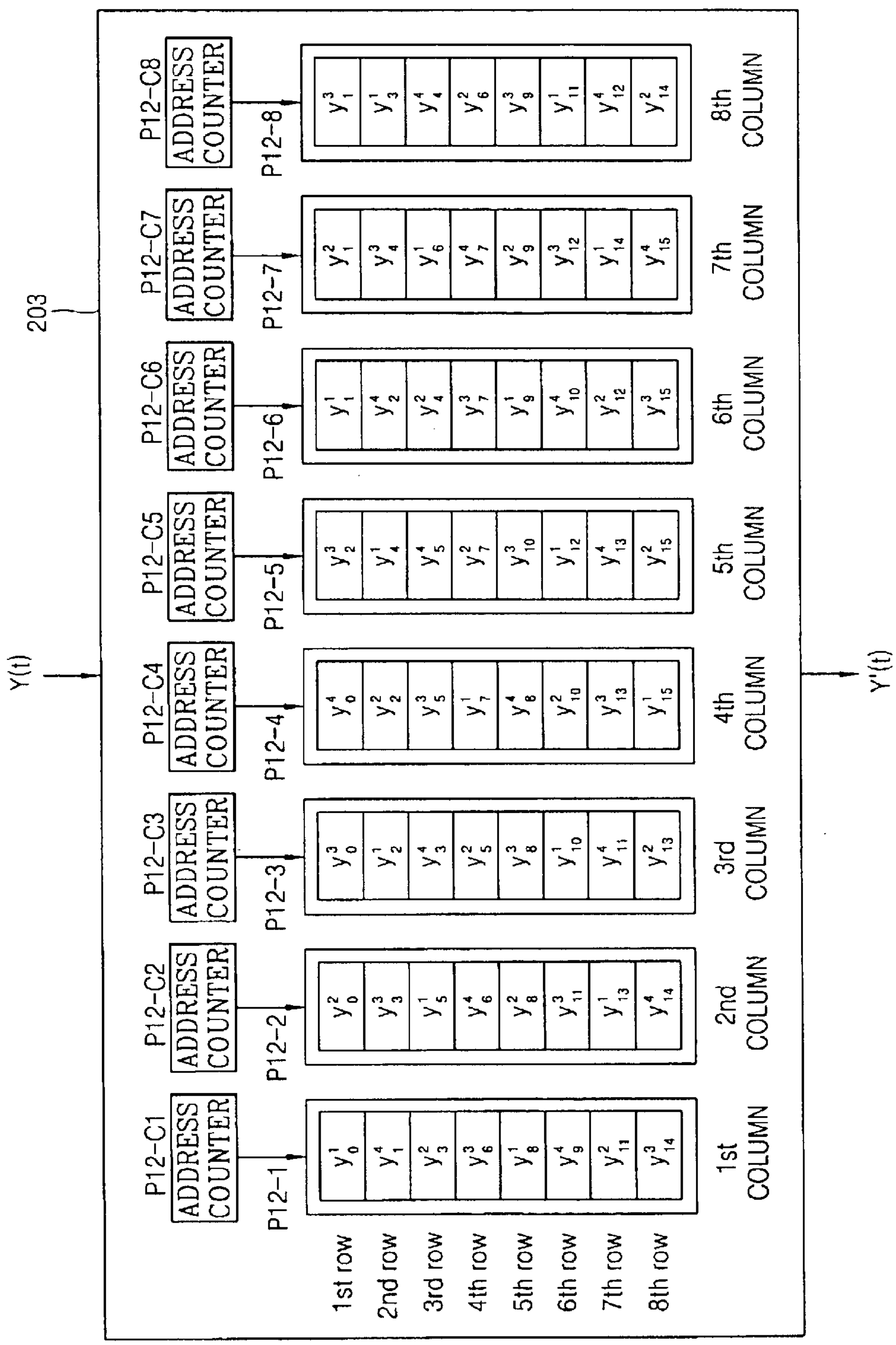
FIG. 8 is a block diagram of a new block interleaver when an imaginary bit is inputted to the interleaver of FIG. 6.

The structure of the memory buffer of the interleaver for solving the above-described problem is depicted in FIG. 8.

In FIG. 8, P12-Ci is an address counter for ith column, and P12-i is a memory buffer for ith column.

As differentiated from the block interleaver 103 of FIG. 2, the block interleaver 203 comprises the memory buffer having each independent column, and an address counter corresponding to the each column of the memory buffer.

In addition, the input sequence of the code word bits to the block interleaver 203 is same with the sequence of the block interleaver 103 of FIG. 1, as depicted in FIG. 8, when the code word bits ($y^1$, $y^2$, $y^3$, $y^4$) outputted from the encoder 201 are inputted to the memory buffers P12-1, P12-2, P12-3, P12-4, the address counters P12-C1, P12-C2, P12-C3, P12-C4 count, when the imaginary bit $y^c$ is inputted to the memory buffer P12-5, the address counter P12-C5 does not count. And, when the code word bits excluding the imaginary bit $y^c$ are inputted to the next memory buffer, the address counters count again. In addition, when the imaginary bit $y^c$ is inputted, the memory buffer P12-5 does not store the imaginary bit, when the code word bit is inputted, the memory buffer P12-5 stores the code word bit.

Finally, the inputted code word bit is outputted to the radio frame segment processing unit as the column direction.

In the embodiments of the present invention, the column permutation for altering the order between the each column of the block interleaver 203 is performed in order to improve the efficiency of the block interleaver 203 before the code word bits inputted to the block interleaver 203 are outputted to the radio frame segment processing unit.

Figure 14:
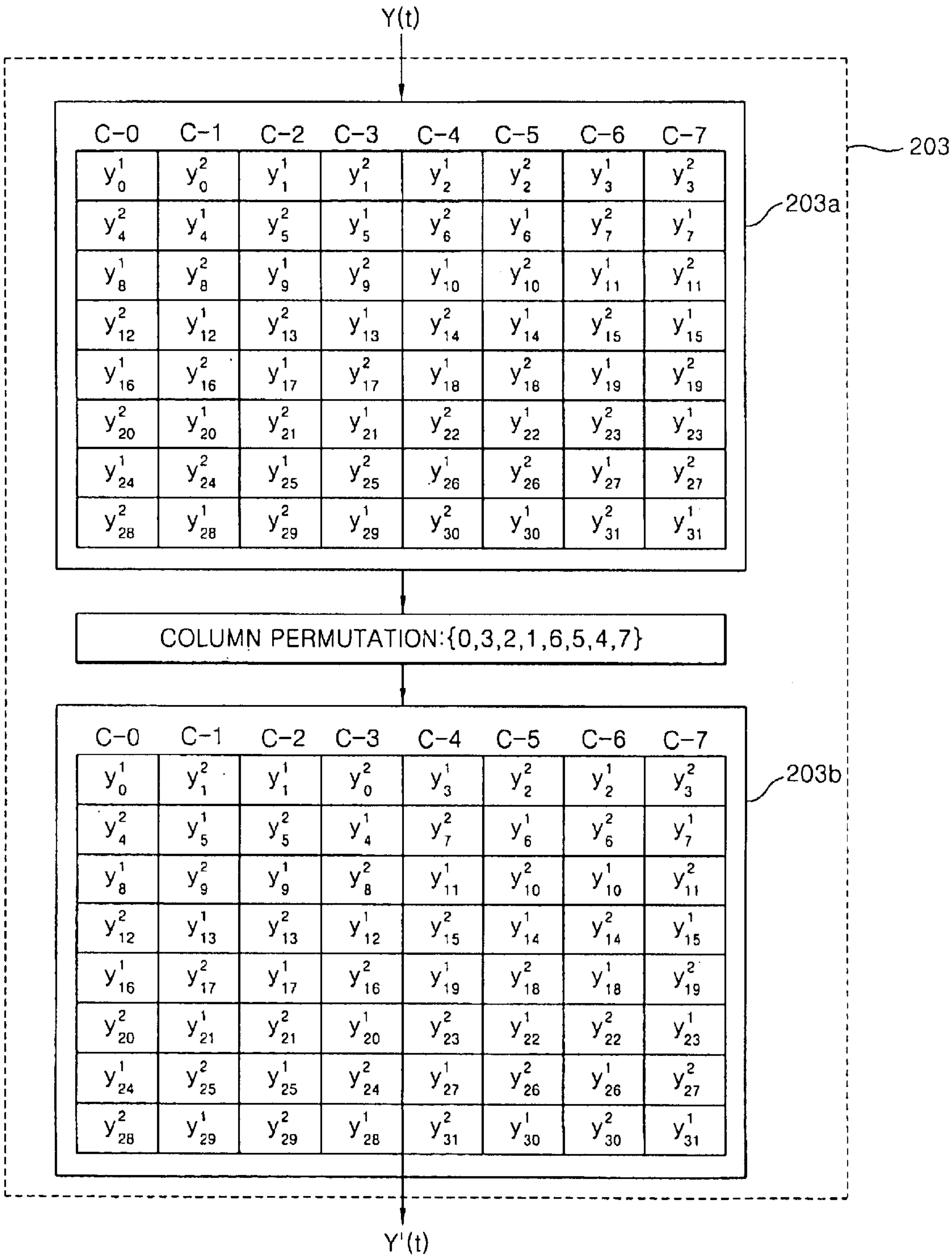
FIG. 14 is a detailed block diagram illustrating an optimum column permutation pattern when the code word bits inputted to the block interleaver are outputted.

FIG. 14 illustrates efficient column permutation in use of the switching algorithm of FIG. 3 when the code word bit number n outputted from the encoder is 2 and column number Fi of the block interleaver is 8.

Herein, 0,3,2,1,6,5,4,7 mean the sequence of column permutation. In other words, as depicted in FIG. 14, when the code word bits stored in the block interleaver 203*a* are outputted to the radio frame processing unit 204, the code word bits on 0th column are outputted first, the code word bits on the next 3rd column are outputted, as same as the order of the block interleaver 203*b*, the code word bits are outputted from the radio program segment processing unit 204.

When the block interleaver 203 performs the column permutation of the code word bits and outputs them, the radio frame segment processing unit 204 is inputted the outputted code word bits, converts them into the radio frame unit, and transmits them to the transmission rate matching unit 205.

Figure 9:
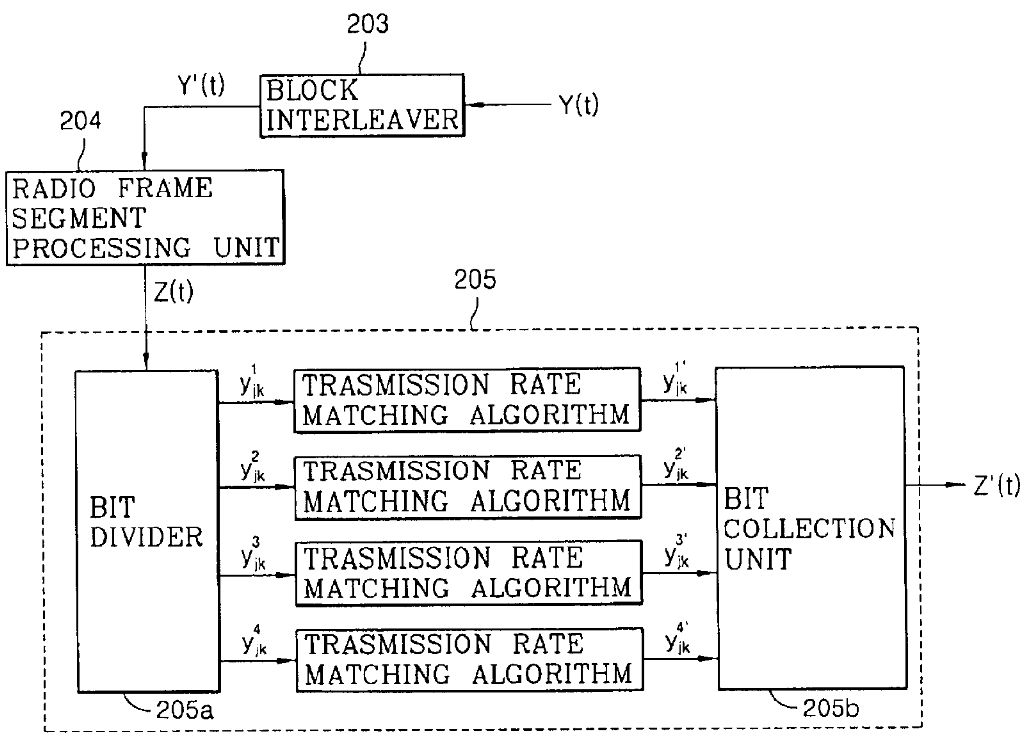
FIG. 9 is a detailed block diagram illustrating the transmission rate matching unit of FIG. 4.
Figures 11, 12:
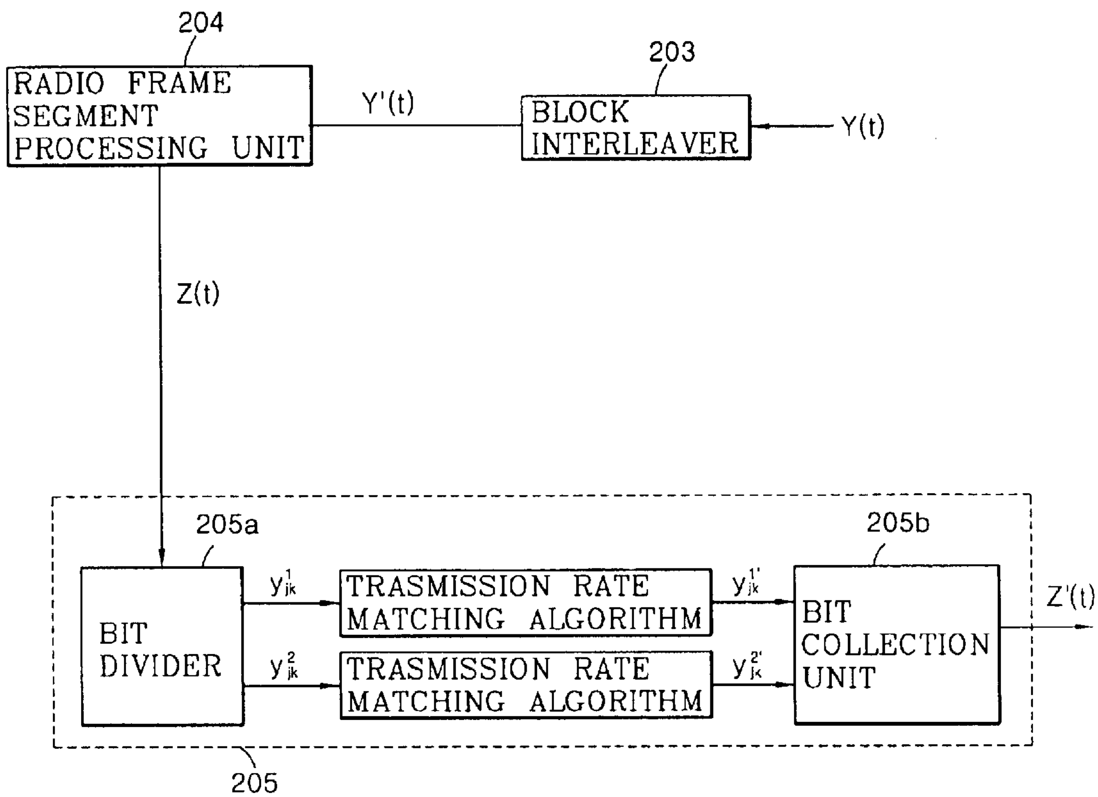
FIG. 11 is a detailed block diagram illustrating a radio frame segment processing unit and transmission rate matching unit of FIG. 10.
FIG. 12 illustrates an algorithm for adjusting storing position of the actual interleaver for storing a bit column outputted from the imaginary interleaver in transmission matching algorithm process of FIGS. 9 and 11.

And, as depicted in FIG. 9 or FIG. 11, a bit divider 205*a* of the transmission rate matching unit 205 of the embodiments of the present invention divides the data bits inside of the radio frame inputted from the radio frame segment processing unit 204 by kinds.

Herein, the output $y_{jk}^t$ of the bit divider 205*a* means kth bit among the bits corresponding to $y^c$ (t) of jth radio frame.

Each matching by the transmission rate matching algorithm is performed to the data bits divided by kinds. And, a bit collection unit 205*b* is inputted the outputted bits $y_{jk}^t$, restores them in order of input of the bit divider 205*b*, forms one radio frame again, and outputs it.

Meanwhile, the transmission rate matching algorithm of FIG. 10 and FIG. 11 shows an optimum performance when it is performed on the imaginary interleaver for the data bits divided by the bit divider 205*a*. In addition, it is possible to perform the optimum transmission rate matching without increase of hardware complexity by using the imaginary interleaver.

Accordingly, as depicted in FIG. 13, the data bits by kinds are stored in the imaginary interleavers 501, 502, the transmission rate matching about the stored data bits is performed, and they are inputted again to the bit collection unit 205*b*.

And, the bit collection unit 205*b* receives data bits by kinds through the transmission rate matching process by using the imaginary interleaver constructed with a algorithm of FIG. 12, the bit collection unit 205*b* is outputted by forming the radio frame again.

In FIG. 12, i is the column number of the imaginary interleaver and j is column number of the block interleaver. When the $y^1$ bit is inputted, b is defined as 2. When the $y^1$ bit is inputted, b is defined as 1 Fi is the column number of the block interleaver, determined as 2, 4 or 8.

For example, when the $y^1_2$ bit stored in C_2 of the imaginary interleaver 501 is inputted, the corresponding store position j in the block interleaver 203 can be found as below with the algorithm of FIG. 12.

Because $y_2^1$ is on the second column, it means i=2 and bit of $y^1$, the interleaver is 8 bit, it means Fi=8. Accordingly, it is adapted to $j=(2\times i+(b-\lfloor 2\times i/ Fi\rfloor)\ \%2)\ \%\ Fi$, it is $j=(2\times 2+(2-\lfloor 2\times 2/8\rfloor)\ \%2)\ \%8$.

Herein, 0.5 is found by calculating (2×2/8), 0 is found by discarding the prime number, 0 is found by performing the 2%2 modular operation. Accordingly, 4 is yielded by performing the 4%8 modular operation. And, the value 4 is stored in C_4 position of the block interleaver 203. And, when the $y^2_{33}$ bit stored in C_3 position of the imaginary interleaver 502 is inputted, the corresponding store position in the block interleaver 203 is determined as below with the algorithm of FIG. 12.

$y_3^2$ is on the third column, it means i=3 and $y^2$ bit and b=1, and the interleaver is 8bit, it means Fi=8.

Accordingly, when it is adapted to $j=(2\times i+(b-\lfloor 2\times i/Fi\rfloor)\ \%2)\ \%\ Fi$, it is $j=(2\times 3+(1-\lfloor 2\times 3/8\rfloor)\ \%2)\ \%8$.

Herein, 0.75 is found by calculating (2×3/8), 0 is found by throwing away the prime number, 1 is found by performing the1%2 modular operation. Accordingly, 7 is yielded by performing 7%8 modular operation.

The yielded value 7 indicates the column number of the block interleaver 203, specifically the C_7 position.

When the data bits are separately inputted from the imaginary interleavers 501, 502 depicted in FIG. 13 with the above-described method, the bit collection unit 205*b* stores them based on the position of the block interleaver 203 by using the algorithm of FIG. 12, and outputs the stored data bits as column.

Figure 15:
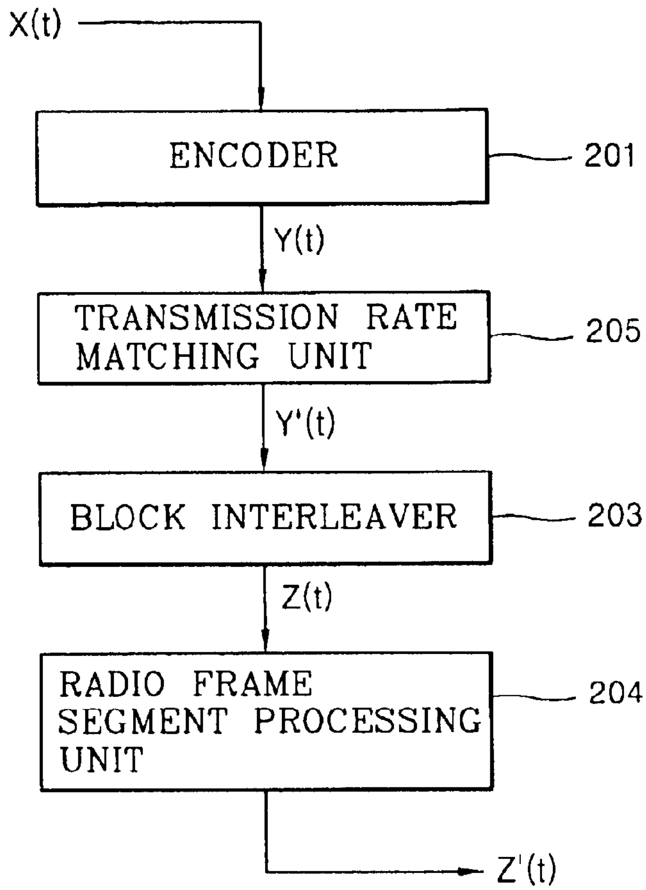
FIG. 15 is a construction profile illustrating the transmission matching apparatus for the next generation mobile communication system of a down-link for transmitting data from a base station to a terminal.
Figure 16:
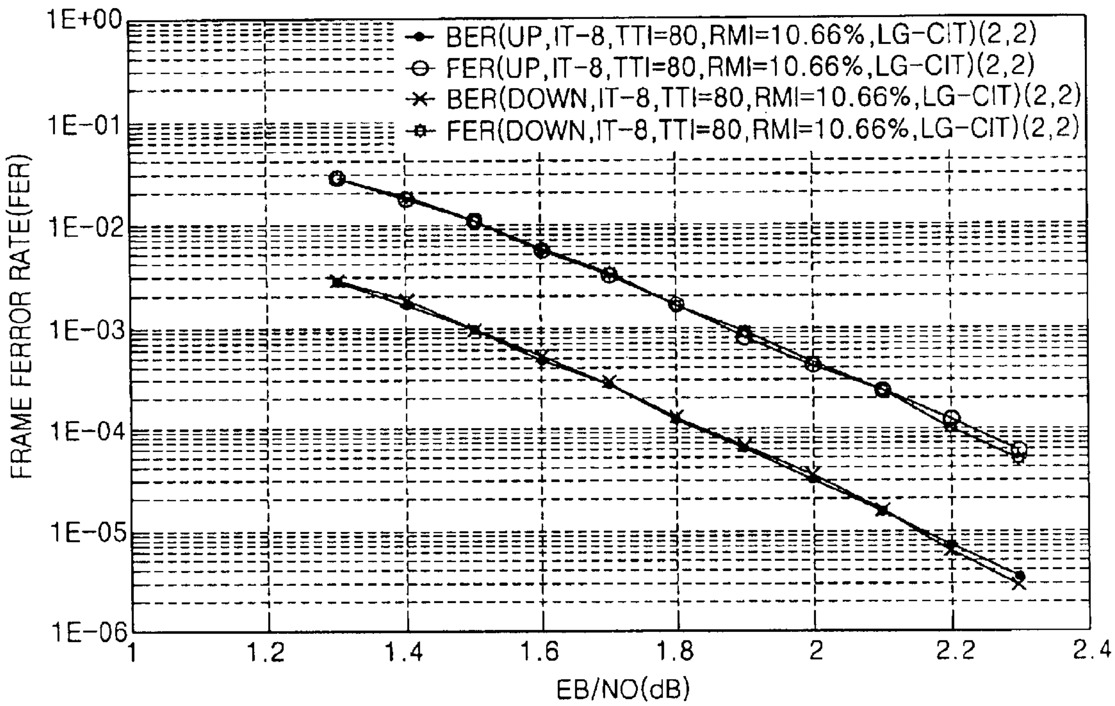
FIG. 16~FIG. 30 are performance comparison graphs illustrating bit error rate (BER) and frame error rate (FER) when data is up-linked from the terminal to the base station by adapting the switching algorithm of FIG. 3 and algorithm of FIG. 13 or data is down-linked from the base station to the terminal as depicted in FIG. 15.
Figure 17:
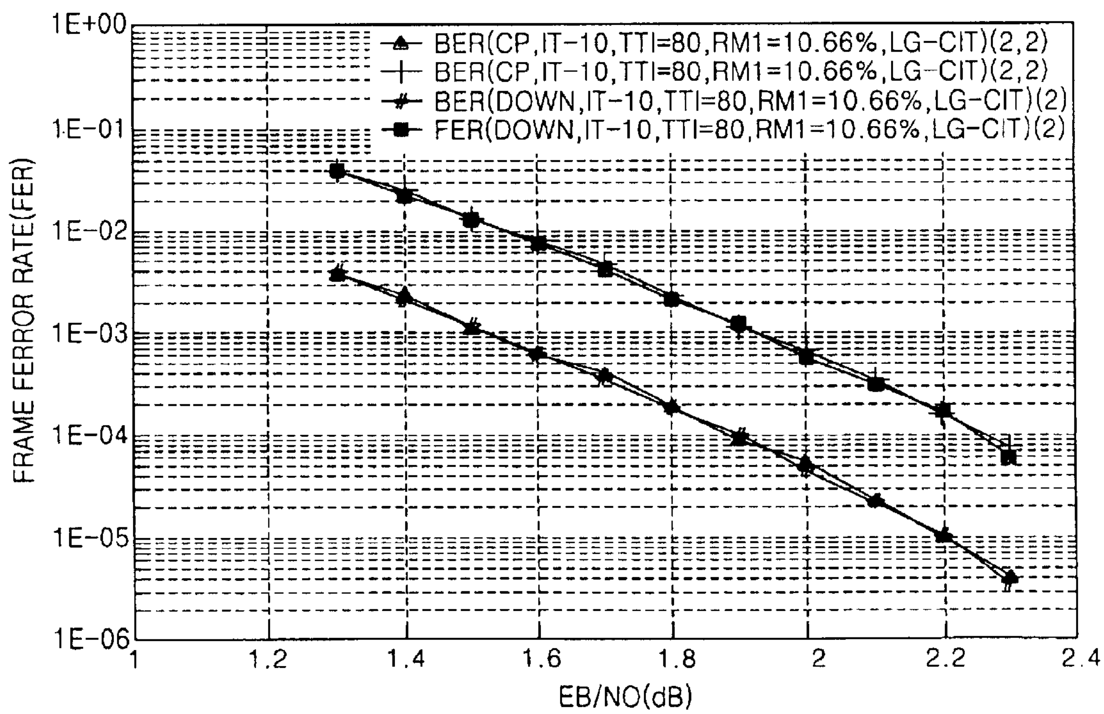
Figure 18:
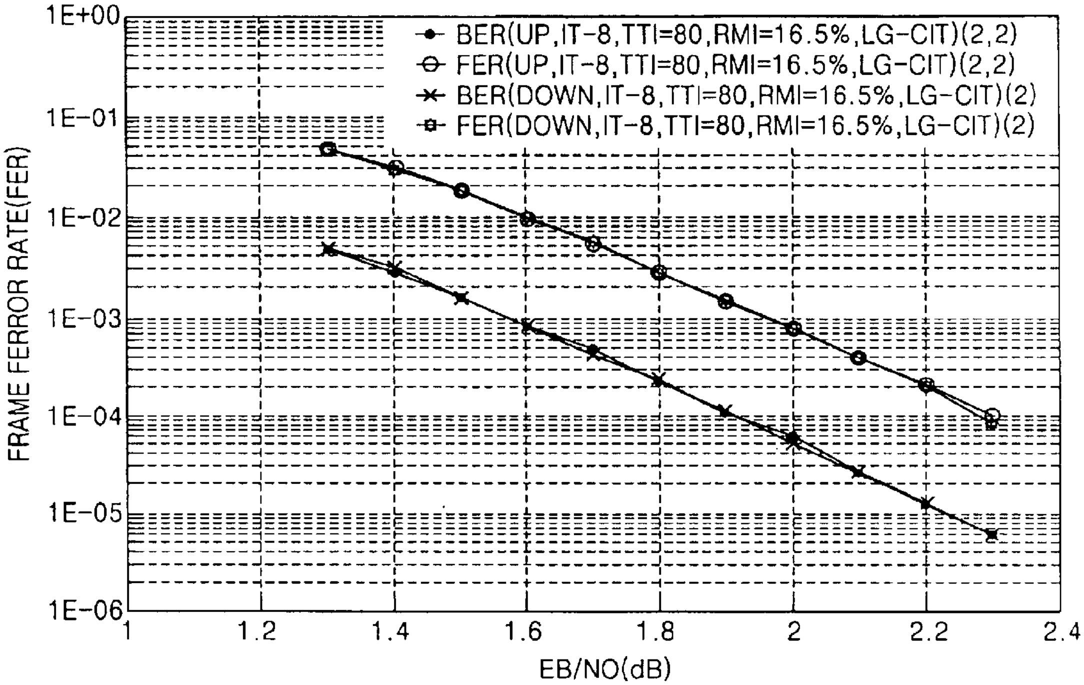
Figure 19:
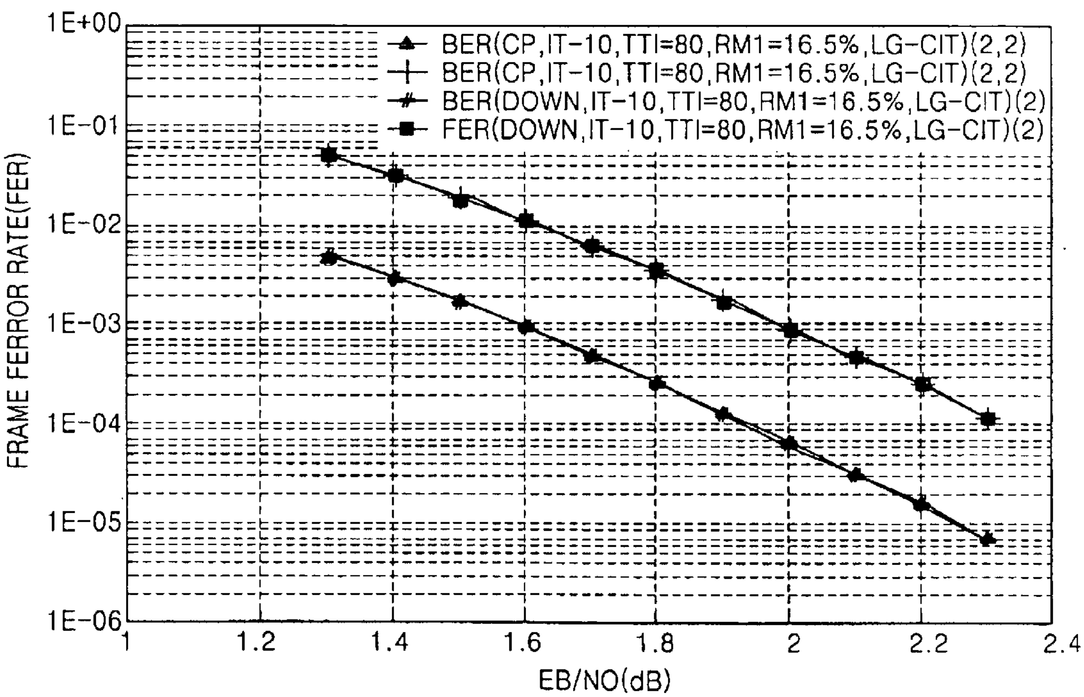
Figure 20:
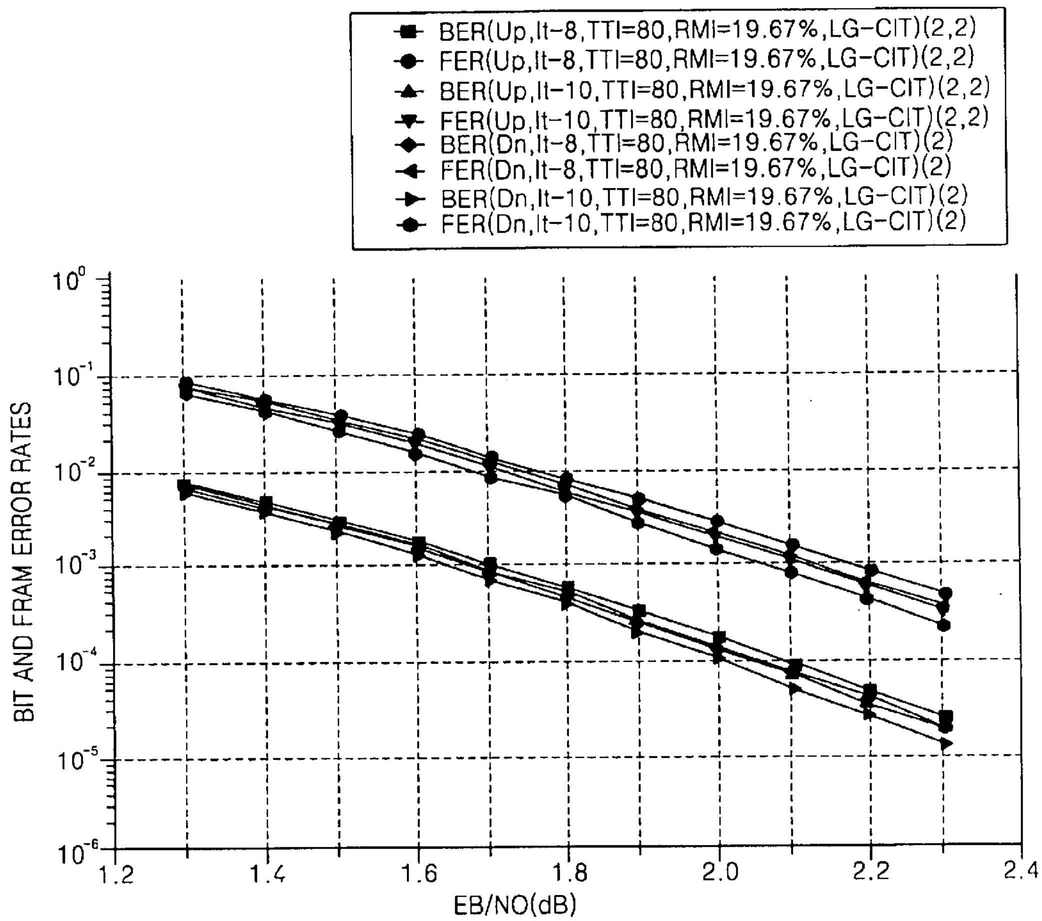
Figure 21:
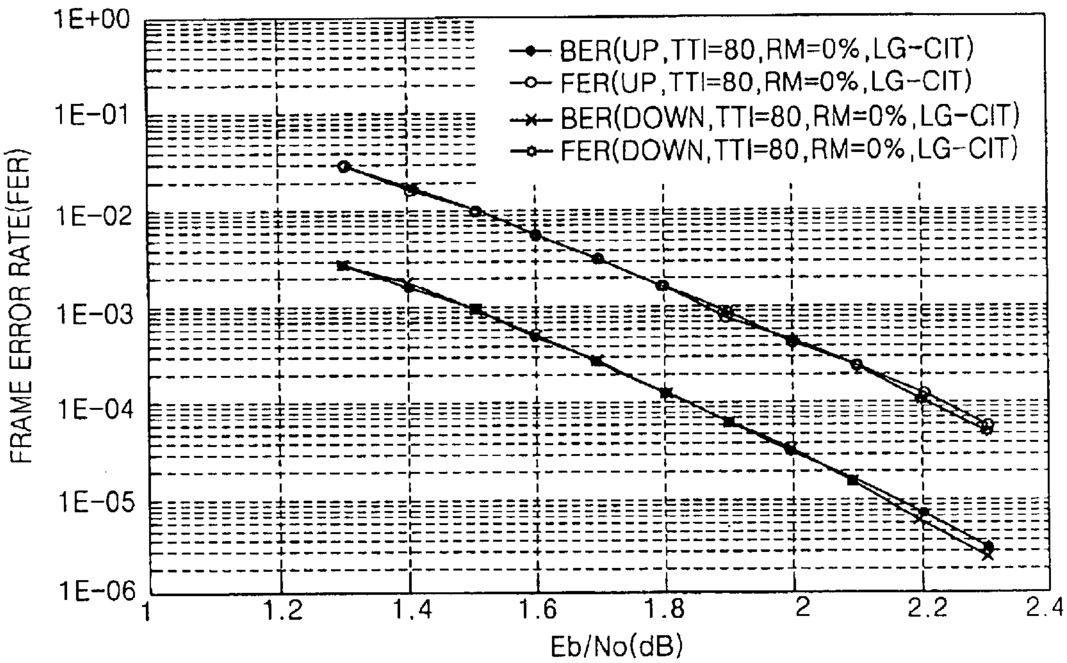
Figure 22:
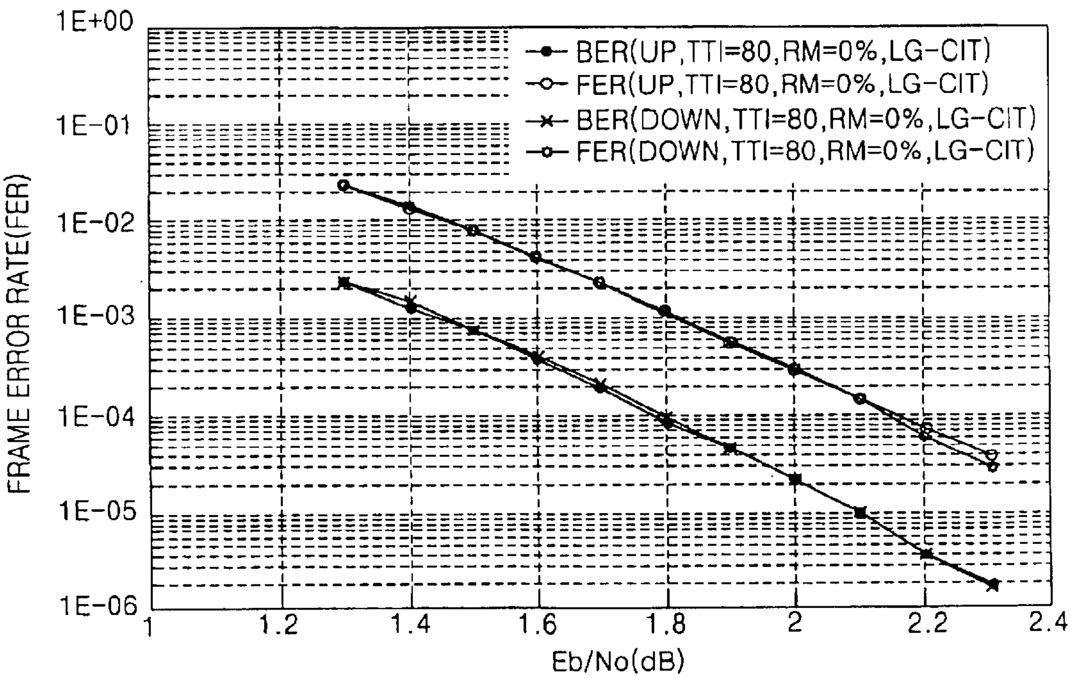
Figure 23:
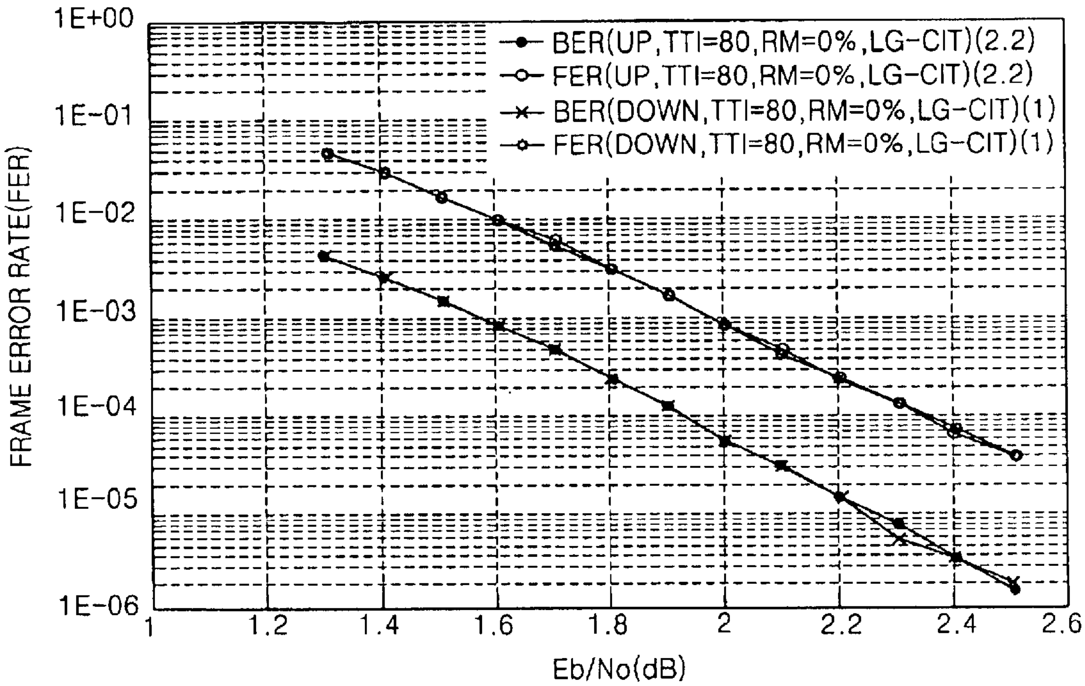
Figure 24:
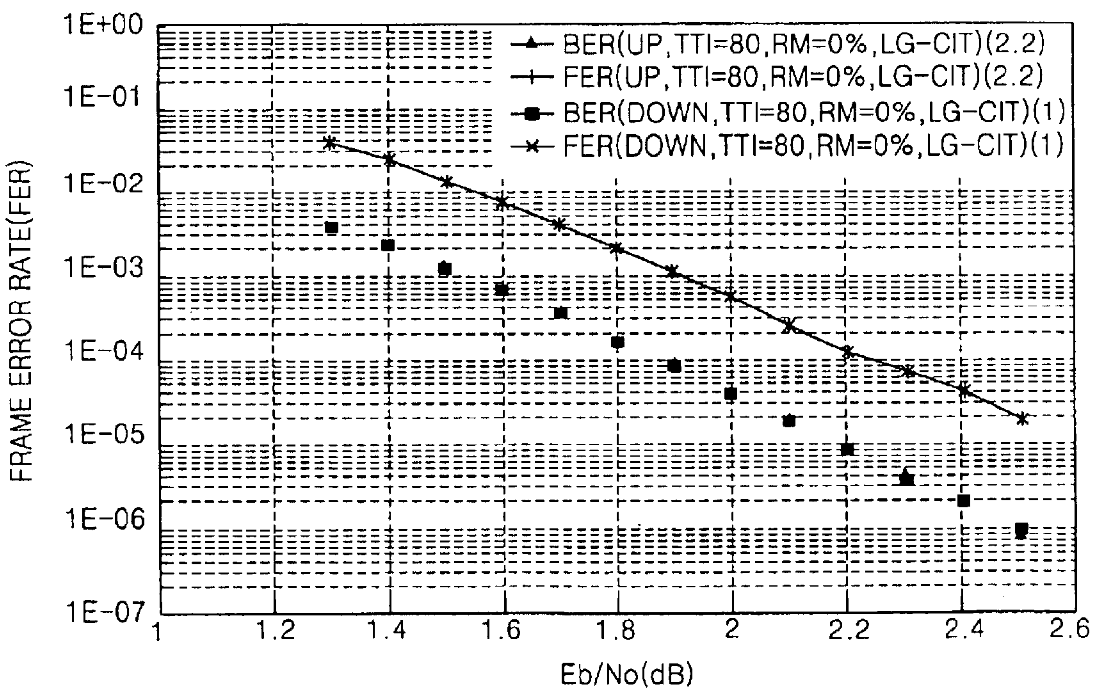
Figure 25:
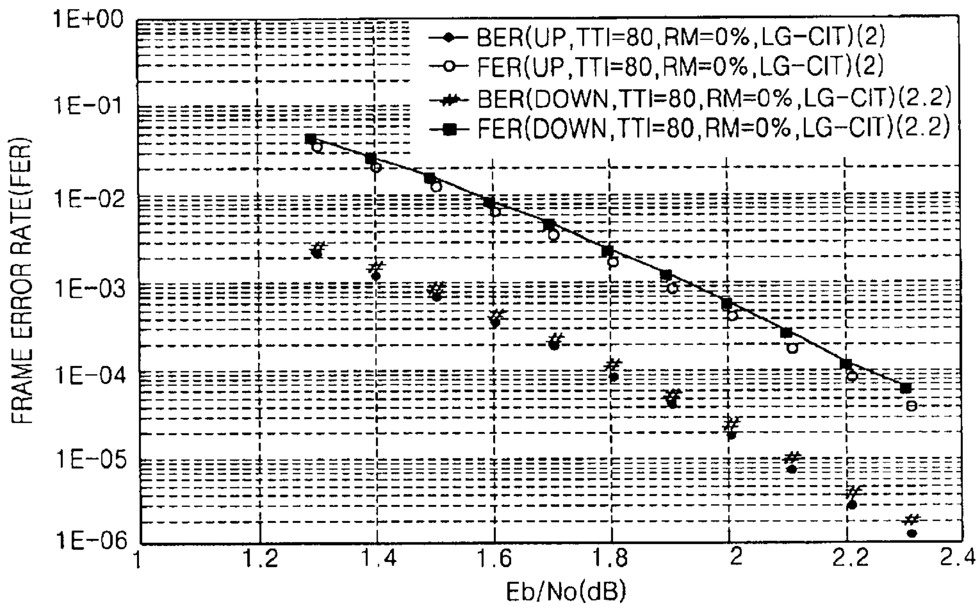

Meanwhile, as depicted in FIG. 15, the efficient transmission sequence of the down-link communication system is in order of the encoder 201, transmission rate matching unit 205, block interleaver 203, and radio frame segment processing unit 204.

The graphs, comparing the each transmission efficiency in the down-link system which transmits a data from the base station to the terminal and in the up-link system which transmits a data from the terminal to the base station, will now be described as below.

First, as depicted in FIG. 16 through FIG. 30, the each experiment value, namely, "Up" means the transmission state from the terminal to the base station, "Down" means the data transmission state from the base station to the terminal, "It" means the times of the repeated decoding process, "TTI" means the transmission time interval, "RMI" means the transmission matching rate, "BER" means the bit error rate, and "FER" means the frame error rate. Herein, FIG. 16 through 25 illustrate a comparing curve in accordance with experiments performed by using a serial chain convolution encoder to the encoder of the up-link system which uses an algorithm of FIG. 1 and FIG. 2 and to the encoder of the down-link system of FIG. 15, the graphs show comparison of the performance yielded by the experiments using the switching algorithm of FIG. 3. In addition, FIG. 16~FIG. 20 illustrate experiment result when input bit number per one data block is 322 and size of the block interleaver is 486.

FIG. 21 through FIG. 25 illustrate performance comparison graphs yielded by the experiments using the algorithm of FIG. 3, they illustrate the experiment result when input bit number per one data block is 322 and size of the block interleaver is 489.

Figure 26:
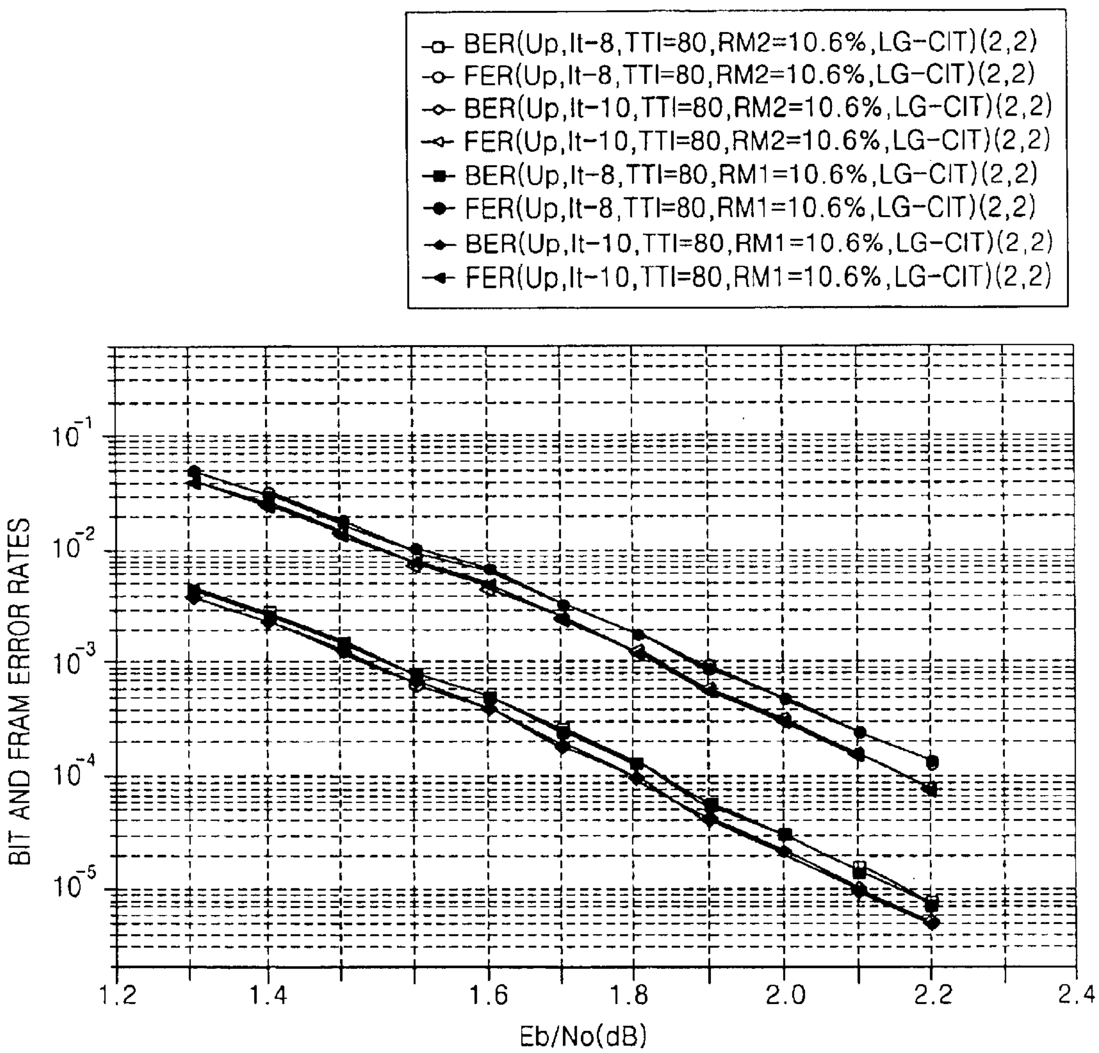
Figure 27:
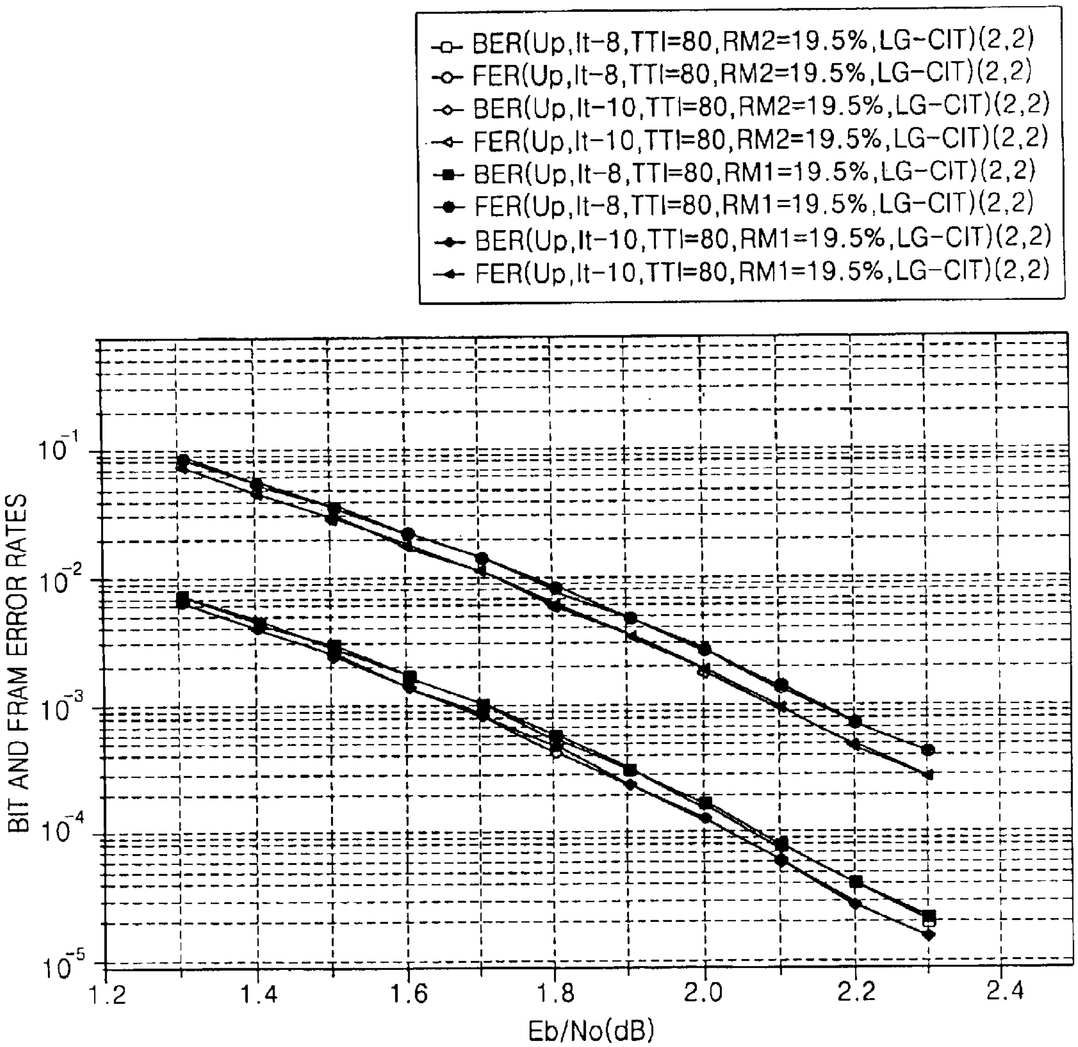
Figure 28:
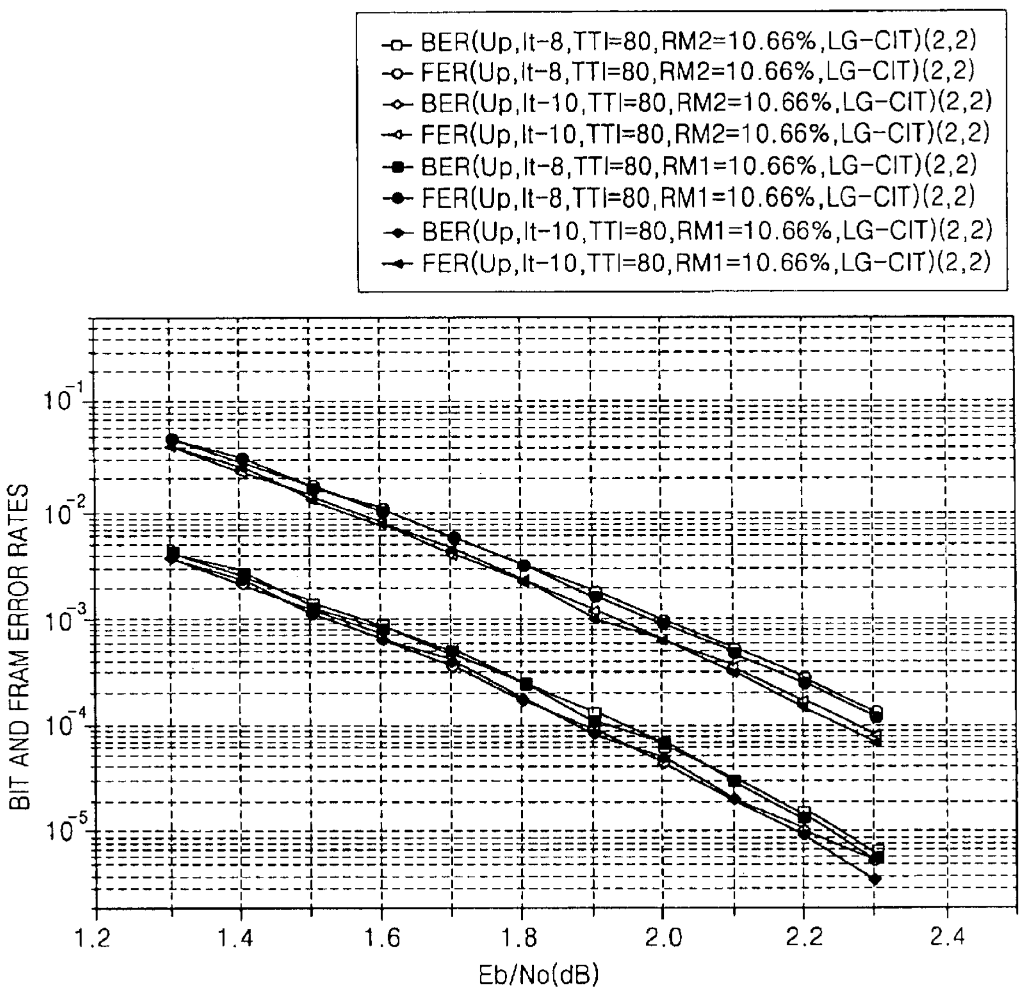
Figure 29:
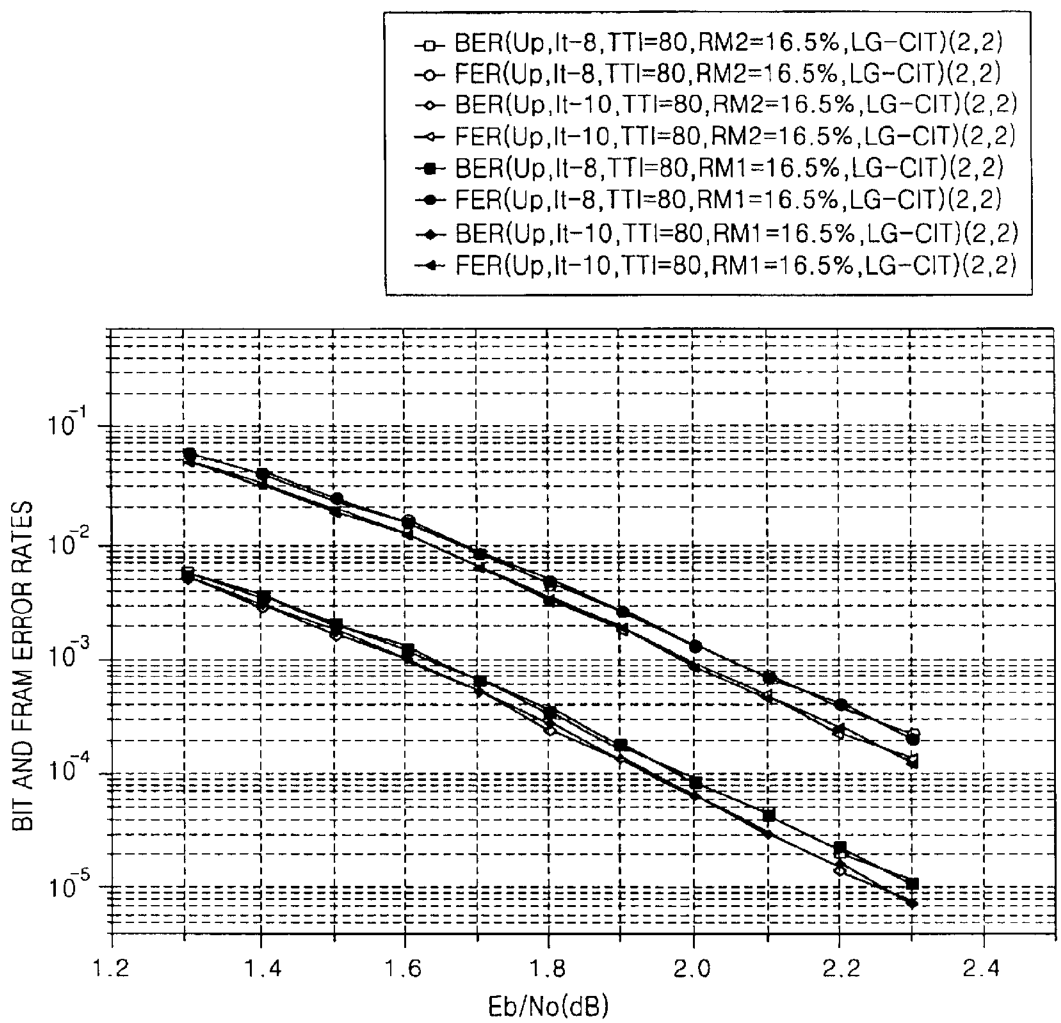
Figure 30:
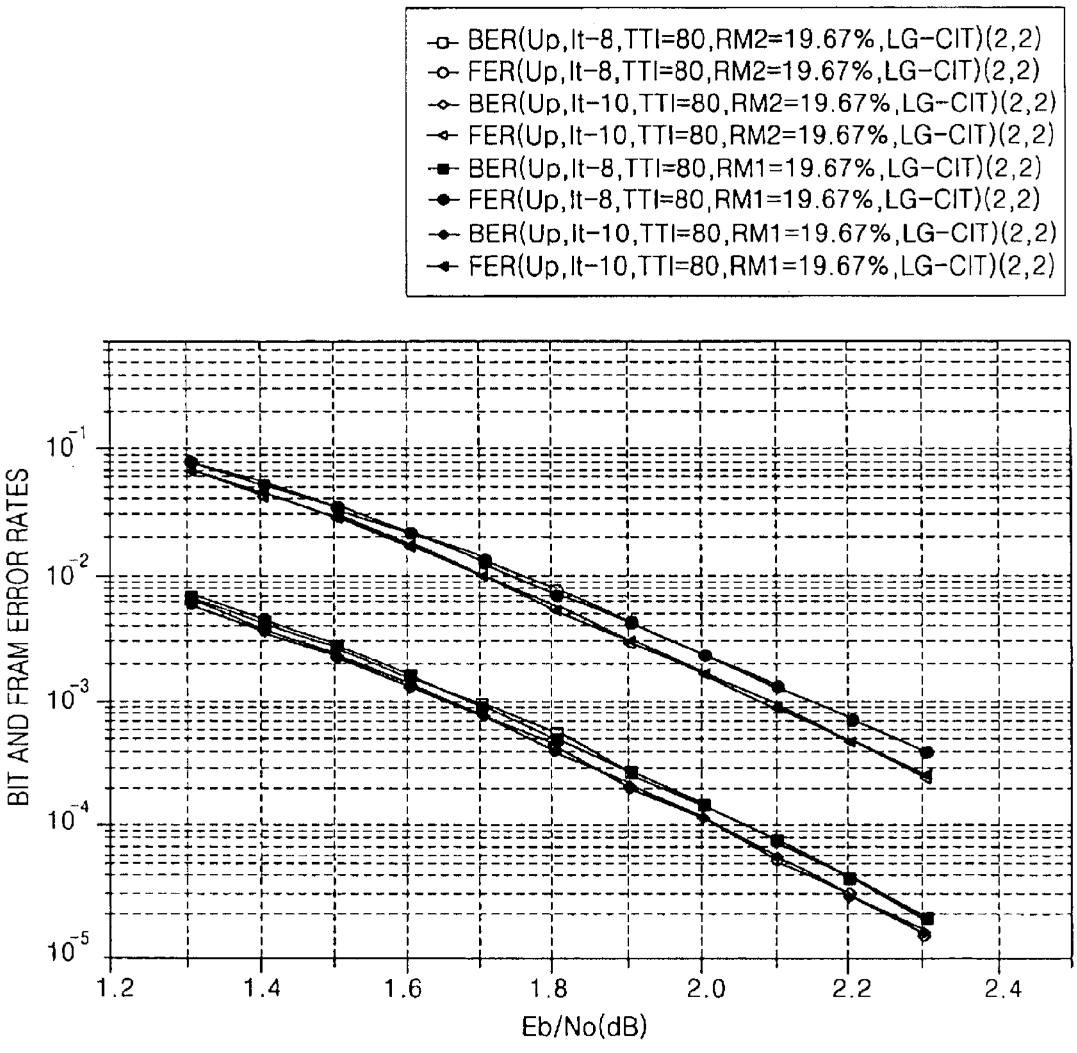

FIG. 26 through FIG. 30 are graphs illustrating experiments performed by using the serial chain convolution encoder to the encoder of the up-link system of FIG. 1, the graphs compares the performance yielded by the experiments using the switching algorithm of FIG. 5. Herein, FIG. 26 and FIG. 27 illustrate the experiment result when input bit number per one data block is 324 and size of the block interleaver is 489. In addition, FIG. 28~FIG. 30 illustrate the experiment result when input bit number per one data block is 322 and size of the block interleaver is 486.

In result, the bit error rate BER as the upper limit and the frame error rate FER as the lower limit are described almost same in the all graphs of FIG. 16~FIG. 30.

As described above, when the transmission matching process is performed after interleaving the code word generated in the error-correction-encoding process through the block interleaver, the present invention can perform the efficient transmission rate matching by distributing the data bits included in the each column of the block interleaver uniformly.

In addition, the present invention can improve the performance by reducing bit error rate and frame error rate without the hardware-like complexity added in the system.

And, the present invention is efficient in transmission power or system performance or user quantity aspect by the performance improvement.

In addition, the present invention can be adapted to any system for distributing the data bits included in the each column of the block interleaver uniformly.

What is claimed is:

1. A transmission rate matching apparatus for a mobile communication system, the apparatus comprising:

an encoder adapted to perform error-correction-encoding of an input bit column and generate code word bits from the error-correction-encoded input bit column;

a block interleaver adapted to receive the code word bits, store the code word bits as row unit data, and output the code word bits as column unit data; a switching unit adapted to perform a switching algorithm for converting an output sequence of the code word bits crossly and output the converted output sequence of the code word bits to the block interleaver in order to distribute biased data bits included in each column of the block interleaver uniformly when the number of the code word bits of the encoder and the number of the columns of the block interleaver are not coprime;

a radio frame segment processing unit adapted to generate a radio frame after receiving the column unit data output from the block interleaver; and a transmission rate matching unit adapted to match data bits included in the radio frame to a transmission format suitable for transmission between a terminal and a base station, and transmit the radio frame.

2. A transmission rate matching apparatus for a mobile communication system, the apparatus comprising:

an encoder adapted to perform error-correction-encoding of an input bit column and generate code word bits from the error-correction-encoded input bit column;

a block interleaver adapted to receive the code word bits, store the code word bits as row unit data, and output the code word bits as column unit data;

a switching unit adapted to perform a switching algorithm to orderly switch the bits output from the encoder and imaginary bits set in advance and to output the switched bits to the block interleaver in order to distribute biased data bits included in each column of the block interleaver uniformly when the number of the code word bits of the encoder and the number of the columns of the block interleaver are not coprime;

a radio frame segment processing unit adapted to generate a radio frame after receiving the column unit data output from the block interleaver; and a transmission rate matching unit adapted to match data bits included in the radio frame to a transmission format suitable for transmission between a terminal and a base station and to transmit the radio frame.

3. The transmission rate matching apparatus according to claim 2, wherein the block interleaver comprises an address counter adapted to not count when a signal including an imaginary bit is received and adapted to count when a signal excluding an imaginary bit is received.

4. The transmission rate matching apparatus according to claim 1, wherein the block interleaver is further adapted to perform a column permutation to alter a sequence of each column before outputting the column unit data.

5. The transmission rate matching apparatus according to claim 1, wherein the block interleaver is adapted to output the code word bits by permuting a sequence of each column in the order of $0^{th}$ column code word bits output, $3^{rd}$ column code word bits output, $2^{nd}$ column code word bits output, $1^{st}$ column code word bits output, $6^{th}$ column code word bits output, $5^{th}$ column code word bits output, $4^{th}$ column code word bits output and $7^{th}$ column code word bits output.

6. The transmission rate matching apparatus according to claim 1, wherein the transmission rate matching unit comprises a bit divider adapted to divide the bits included in the radio frame.

7. The transmission rate matching apparatus according to claim 6, wherein the transmission rate matching unit further comprises a bit collection unit adapted to store the result of transmission rate matching of the divided bits performed in imaginary interleavers and to restore and output the transmission rate matched bits in the order the bits were received in the bit divider.

8. The transmission rate matching apparatus according to claim 7, wherein the bit collection unit stores the bits output from the imaginary interleavers according to the corresponding bit positions of the block interleaver.

9. A transmission rate matching method for a mobile communication system, the method comprising:

performing error-correction-encoding of an input bit column and generating code word bits from the error-correction-encoded input bit column;

storing the code word bits as row unit data and outputting the code word bits as column unit data using a block interleaver;

converting an output sequence of the code word bits crossly and outputting the converted sequence to the block interleaver in order to distribute biased data bits included in each column of the block interleaver uniformly when the number of the code word bits of the encoder and the number of the columns of the block interleaver are not coprime;

generating a radio frame by receiving the column unit data output from the block interleaver in a radio frame segment processing unit; and matching the data bits included in the radio frame to a transmission format suitable for transmission between a terminal and a base station and transmitting the data bits included in the radio frame.

10. The transmission rate matching method according to claim 9, wherein matching and transmitting the data bits included in the radio frame comprises:

dividing the bits included in the radio frame using a bit divider.

11. A transmission rate matching method for a mobile communication system, the method comprising:

performing error-correction-encoding of an input bit column in an encoder and generating code word bits from the error-correction-encoded input bit column;

storing the code word bits as row unit data, and outputting the code word bits as column unit data using a block interleaver;

switching bits output from the encoder and an imaginary bit set in advance and transferring the switched bits to the block interleaver in order to uniformly distribute biased data bits included in each column of the block interleaver when the number of code word bits of the encoder and the number of columns of the block interleaver are not coprime;

generating radio frames by receiving the column unit data output from the block interleaver in a radio frame segment processing unit; and matching the data bits included in each radio frame to a transmission format adaptable for transmission between a terminal and a base station and transmitting the data bits included in each radio frame.

12. The transmission rate matching method according to claim 11, wherein transferring the switched bits to the block interleaver further comprises:

storing as many code word bits in the block interleaver as a number of columns in the block interleaver; and determining a counting operation in accordance with the input of the imaginary bit to a memory buffer.

13. The transmission rate matching method according to claim 10, wherein matching and transmitting the data bits included in the radio frame further comprises:

performing the matching about the divided bits in an imaginary interleaver; and storing the matched bits in the order the bits included in the radio frame were received in the bit divider.

14. The transmission rate matching method according to claim 13, wherein storing the matched bits comprises:

storing the bits output from the imaginary interleaver according to corresponding bit positions of the block interleaver.

15. The transmission rate matching method according to claim 14, wherein storing the bits output from the imaginary interleaver is performed according to the following equation $$j=(2\times i+(b-\lfloor 2\times i/Fi \rfloor)\ \%2)\ \%\ Fi$$

wherein, i is the column number of the imaginary interleaver, j is the column number of the block interleaver, Fi is number of the columns of the block interleaver, and b is a constant determined in accordance with the divided bits.

* * * * *